United States Patent
Goss

(10) Patent No.: US 9,937,643 B2
(45) Date of Patent: Apr. 10, 2018

(54) CONCRETE FORMING SYSTEMS AND METHODS

(71) Applicant: GOSS CONSTRUCTION, INC., Fisherville, KY (US)

(72) Inventor: Richard A. Goss, Fisherville, KY (US)

(73) Assignee: Goss Construction, Inc., Fisherville, KY (US)

( * ) Notice: Subject to any disclaimer, the term of this patent is extended or adjusted under 35 U.S.C. 154(b) by 737 days.

(21) Appl. No.: 14/216,827

(22) Filed: Mar. 17, 2014

(65) Prior Publication Data

US 2014/0197573 A1 Jul. 17, 2014

Related U.S. Application Data

(63) Continuation of application No. PCT/US2012/055628, filed on Sep. 14, 2012.

(60) Provisional application No. 61/535,875, filed on Sep. 16, 2011.

(51) Int. Cl.
*B29C 39/10* (2006.01)
*E02D 27/32* (2006.01)

(52) U.S. Cl.
CPC .............. *B29C 39/10* (2013.01); *E02D 27/32* (2013.01)

(58) Field of Classification Search
CPC ................................. B29C 39/10; E02D 27/32
USPC ............ 249/205, 207, 210, 211, 219.1, 217; 264/35, 333, 279.1, 271.1
See application file for complete search history.

(56) References Cited

U.S. PATENT DOCUMENTS

| | | |
|---|---|---|
| 2,760,272 A | 8/1956 | Van Cantle |
| 3,150,429 A | 9/1964 | Shaffer |
| 3,219,308 A * | 11/1965 | Halstead ................. E02D 27/00 249/205 |
| 3,295,817 A | 1/1967 | Carlsen |
| 3,458,184 A | 7/1969 | Schlosser |
| 3,685,302 A | 8/1972 | Fuller |
| 3,810,339 A | 5/1974 | Russo |
| 3,829,540 A | 8/1974 | Cox |
| 3,858,866 A | 1/1975 | Armstrong et al. |
| 3,960,357 A | 6/1976 | Honea, Jr. |
| 3,963,210 A | 6/1976 | Macklin |

(Continued)

FOREIGN PATENT DOCUMENTS

| | | |
|---|---|---|
| AU | 2010257353 | 7/2012 |
| JP | 5132951 | 5/1993 |

(Continued)

OTHER PUBLICATIONS

International Search Report & Written Opinion for PCT/US2012/055628 dated Jan. 31, 2013.

*Primary Examiner* — Nahida Sultana
(74) *Attorney, Agent, or Firm* — Breakwater Law Group

(57) ABSTRACT

Systems and methods for constructing concrete foundations are provided which allow for rapid and high-precision placement and alignment of anchor bolts across large distances. A frame system is constructed outside of an excavation and then suspended, using supports, over an excavation. The frame system can include a frame having one or more templates for anchor bolts, a form suspended from the frame, and a mat and cage assembly tied to the frame. The frame system can be aligned in proper position and the anchor bolts placed in the frame system before the concrete is placed. In this way, the anchor bolts can be cast in place as the footing is placed.

19 Claims, 17 Drawing Sheets

(56) References Cited

U.S. PATENT DOCUMENTS

| | | | |
|---|---|---|---|
| 4,099,354 A | 7/1978 | DePirro | |
| 4,101,111 A * | 7/1978 | Bishop | B28B 7/0029 |
| | | | 248/351 |
| 4,106,743 A | 8/1978 | Dendinger | |
| 4,261,544 A | 4/1981 | Addison | |
| 4,342,440 A * | 8/1982 | Eyden | E04G 17/18 |
| | | | 249/187.1 |
| 4,348,002 A * | 9/1982 | Eyden | E04G 17/16 |
| | | | 249/187.1 |
| 4,349,491 A * | 9/1982 | Eyden | E04G 17/18 |
| | | | 249/187.1 |
| 4,357,755 A | 11/1982 | Allen et al. | |
| 4,383,674 A | 5/1983 | Fricker | |
| 4,434,600 A | 3/1984 | Backman | |
| 4,470,574 A * | 9/1984 | Jackson | E04G 7/20 |
| | | | 211/182 |
| 4,591,466 A | 5/1986 | Murray et al. | |
| 4,736,554 A | 4/1988 | Tyler | |
| 4,749,165 A | 6/1988 | Moraca | |
| 4,750,306 A | 6/1988 | Granieri | |
| 4,790,509 A * | 12/1988 | Cardwell | E04G 17/14 |
| | | | 248/59 |
| 4,817,353 A | 4/1989 | Woods et al. | |
| 4,932,818 A | 6/1990 | Garwood | |
| 4,972,641 A | 11/1990 | Barrios | |
| 5,050,364 A | 9/1991 | Johnson et al. | |
| 5,060,436 A | 10/1991 | Delgado, Jr. | |
| 5,240,224 A | 8/1993 | Adams | |
| 5,257,489 A | 11/1993 | Angelette | |
| 5,375,339 A | 12/1994 | Noel, Jr. | |
| 5,388,804 A | 2/1995 | Cohen et al. | |
| 5,419,055 A | 5/1995 | Meadows | |
| 5,533,835 A | 7/1996 | Angelette | |
| 5,551,662 A | 9/1996 | Keady | |
| 5,586,417 A | 12/1996 | Henderson et al. | |
| 5,630,303 A | 5/1997 | Devenish, III | |
| 5,678,382 A | 10/1997 | Naito | |
| 5,707,180 A | 1/1998 | Vickars et al. | |
| 5,746,036 A | 5/1998 | Angelette | |
| 5,758,460 A | 6/1998 | MacKarvich | |
| 5,826,387 A | 10/1998 | Henderson et al. | |
| 5,924,264 A | 7/1999 | Vierra | |
| 6,082,700 A | 7/2000 | Lancelot, III et al. | |
| 6,098,357 A * | 8/2000 | Franklin | E04B 2/14 |
| | | | 52/223.7 |
| 6,120,723 A | 9/2000 | Butler | |
| 6,138,421 A | 10/2000 | Grigsby | |
| 6,141,937 A | 11/2000 | Dressler | |
| 6,435,776 B2 | 8/2002 | Vickars et al. | |
| 6,449,791 B1 * | 9/2002 | Vodicka | E01D 19/02 |
| | | | 14/75 |
| 6,591,574 B2 | 7/2003 | Humphrey | |
| 6,643,945 B1 | 11/2003 | Starks | |
| 6,666,441 B2 | 12/2003 | Grendahl | |
| 6,685,399 B2 | 2/2004 | Iemura et al. | |
| 6,854,227 B2 | 2/2005 | Grendahl | |
| 6,893,598 B1 | 5/2005 | March | |
| 6,899,535 B2 | 5/2005 | Mihelcic et al. | |
| 7,103,984 B2 | 9/2006 | Kastberg | |
| 7,131,240 B2 | 11/2006 | Simmons | |
| 7,174,689 B2 | 2/2007 | Alyea et al. | |
| 7,225,589 B1 | 6/2007 | Smith | |
| 7,243,897 B2 | 7/2007 | Huber et al. | |
| 7,435,038 B2 | 10/2008 | Peterson | |
| 7,444,787 B2 | 11/2008 | Cutforth | |
| 7,445,192 B2 | 11/2008 | Gridley et al. | |
| 7,454,872 B2 | 11/2008 | Cutforth | |
| 7,473,383 B2 | 1/2009 | Mihelcic et al. | |
| 7,487,597 B2 | 2/2009 | Diaz | |
| 7,533,505 B2 | 5/2009 | Henderson | |
| 7,637,072 B2 | 12/2009 | Parish | |
| 7,677,522 B2 | 3/2010 | Bakos | |
| 7,707,797 B2 | 5/2010 | Henderson | |
| 7,735,273 B2 | 6/2010 | Knepp et al. | |
| 7,823,348 B1 * | 11/2010 | Leiva | E02D 27/42 |
| | | | 52/170 |
| 7,877,889 B2 | 2/2011 | Griffin, Jr. | |
| 7,891,110 B2 | 2/2011 | Diaz | |
| 7,921,616 B2 | 4/2011 | Reyneveld | |
| 7,984,541 B1 | 7/2011 | Davidson | |
| 8,056,299 B2 | 11/2011 | Liskey | |
| 8,136,260 B1 | 3/2012 | Jones | |
| 8,141,320 B2 | 3/2012 | Colonias | |
| 8,146,323 B1 | 4/2012 | Tooman | |
| 8,161,698 B2 | 4/2012 | Migliore | |
| 8,201,332 B2 | 6/2012 | Tourneur et al. | |
| 8,235,346 B2 | 8/2012 | Bakos | |
| 8,641,940 B2 * | 2/2014 | Calderon Degollado | C03B 5/237 |
| | | | 264/297.9 |
| 2002/0000076 A1 | 1/2002 | Goeku | |
| 2003/0062651 A1 * | 4/2003 | Tsuyuki | B28B 1/10 |
| | | | 264/219 |
| 2003/0067096 A1 * | 4/2003 | Jurik | B28B 7/0061 |
| | | | 264/333 |
| 2004/0139690 A1 * | 7/2004 | Pina | E04B 7/022 |
| | | | 52/745.15 |
| 2005/0252123 A1 | 11/2005 | Colonias | |
| 2006/0016140 A1 | 1/2006 | Smith | |
| 2006/0029471 A1 * | 2/2006 | DelZotto | E02B 3/068 |
| | | | 405/4 |
| 2007/0094995 A1 | 5/2007 | Alyea | |
| 2007/0215784 A1 | 9/2007 | Beery | |
| 2007/0280788 A1 | 12/2007 | Booth | |
| 2008/0072511 A1 | 3/2008 | Phuly | |
| 2008/0088063 A1 * | 4/2008 | Irvin | B28B 5/022 |
| | | | 264/333 |
| 2008/0178556 A1 | 7/2008 | Meeks | |
| 2009/0044482 A1 | 2/2009 | Tooman | |
| 2009/0188034 A1 * | 7/2009 | Gardenier | E04H 4/0018 |
| | | | 4/506 |
| 2009/0293422 A1 | 12/2009 | Brindle, Jr. | |
| 2010/0011698 A1 | 1/2010 | Fearn | |
| 2010/0044548 A1 * | 2/2010 | Schwoerer | E04G 11/486 |
| | | | 249/205 |
| 2010/0107546 A1 | 5/2010 | Diaz | |
| 2010/0257794 A1 | 10/2010 | Stark | |
| 2010/0300038 A1 | 12/2010 | Brindle | |
| 2011/0061321 A1 | 3/2011 | Phuly | |
| 2011/0131899 A1 | 6/2011 | Voss | |
| 2011/0154758 A1 | 6/2011 | Reyneveld | |
| 2011/0192108 A1 | 8/2011 | Kim | |
| 2011/0252722 A1 * | 10/2011 | Laurin | E02D 27/32 |
| | | | 52/126.6 |
| 2012/0038075 A1 * | 2/2012 | Murphy | B28B 7/168 |
| | | | 264/35 |
| 2012/0043680 A1 * | 2/2012 | Knox | E04H 12/12 |
| | | | 264/35 |
| 2012/0055114 A1 | 3/2012 | Roulston | |
| 2012/0079782 A1 * | 4/2012 | Kim | E04B 5/263 |
| | | | 52/220.1 |
| 2012/0131789 A1 | 5/2012 | Zhu | |
| 2013/0306835 A1 * | 11/2013 | Asada | B28B 23/0056 |
| | | | 248/679 |
| 2015/0307170 A1 * | 10/2015 | Wittenberg | E02B 3/064 |
| | | | 114/263 |
| 2016/0076269 A1 * | 3/2016 | Foldenauer | E04H 12/16 |
| | | | 52/649.1 |

FOREIGN PATENT DOCUMENTS

| | | |
|---|---|---|
| JP | 2000144757 | 5/2000 |
| JP | 2001295298 | 10/2001 |
| JP | 2002242202 | 8/2002 |
| JP | 2005282154 | 10/2005 |
| JP | 2005299271 | 10/2005 |
| JP | 3752310 B2 | 12/2005 |
| JP | 2011106186 | 6/2011 |
| KR | 200298103 | 12/2002 |

(56) References Cited

FOREIGN PATENT DOCUMENTS

WO    2005078198         8/2005
WO    WO2010/017388 A1 *  6/2010    ............... C03B 5/42

* cited by examiner

CONCRETE FORMING SYSTEMS AND METHODS

CROSS-REFERENCE TO RELATED APPLICATIONS

This application is a continuation under 35 U.S.C. § 120 of International Application No. PCT/US2012/055628, filed Sep. 14, 2012 (and published by the International Bureau as WO 2013/040495 on Mar. 21, 2013), which claims the benefit of U.S. Provisional Patent Application No. 61/535,875, filed Sep. 16, 2011. Each of the above-referenced applications is hereby incorporated by reference in its entirety.

BACKGROUND OF THE INVENTION

Field of the Invention

This application relates to concrete construction, and more particularly, to systems and methods for constructing concrete footings.

Description of the Related Technology

Concrete footings are structural members that transmit the concentrated loads of an overlying structure to the soil below. These members are generally constructed of steel-reinforced, concrete and are formed in various shapes and sizes. A footing typically includes one or more anchor bolts extending from the top of the footing, which serve to connect the footing to vertical supports for the overlying structure.

Footings are normally cast directly into an excavation formed in the soil. To build a spread footing, a mat (i.e., a metal framework to reinforce the bottom portion of the footing) is laid down into the excavation, and a cage (i.e., a metal framework to reinforce the upper portion, also referred to as the "pier" or "column" of the footing) is set on top of the mat and secured in position. Concrete is then placed over the mat and allowed to harden. The upper surface of the hardened concrete is then finished to produce a flat surface upon which the column can be formed. Next, a column form is placed, over the cage, inside the excavation, and concrete is placed into the form to build up the column. After the column concrete is placed, anchor bolts are inserted into the wet concrete at the top of the column and their positions are adjusted as needed. The column is then allowed to harden, after which the upper surface of the column is finished smooth.

SUMMARY

The systems and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments," one will understand how the features of this invention provide several advantages over traditional catheter securement systems.

In one aspect, a method of forming a concrete footing in an excavation comprises providing a frame assembly, the frame assembly comprising a frame configured to extend over the excavation from a first side of the excavation to an opposing second side of the excavation; a form coupled to the frame, the form, configured to define at least part of the shape of the concrete footing; a reinforcement structure configured to reinforce concrete, at least part of the reinforcement structure being disposed within the form; and a template defining an inbed pattern over the form. The method further comprises coupling at least one inbed to the template, positioning the frame assembly over an excavation such that at least part of the form and at least part of the reinforcement structure are suspended in the excavation, and placing concrete into the form. Concrete can be placed into the form until at least a lower portion of the at least one inbed can be surrounded by concrete. The reinforcement structure can be releasably coupled to the frame. The method, can further comprise separating the frame and the form from the concrete footing. The frame and the form can remain coupled, to one another as they are separated from the concrete footing. The method can further comprise forming a second concrete footing in a second excavation using the frame assembly. The at least one inbed can be one or more anchor bolts, or any other type of inbed which may be used, in concrete construction. Positioning the frame assembly over an excavation can comprise placing the frame assembly on supports disposed on the first and second sides of the excavation. The supports can be set to grade before the frame assembly is placed on the supports.

In another aspect, an assembly for use in forming a concrete footing in an excavation is provided. The assembly comprises a frame configured to extend over the excavation from a first side of the excavation to an opposing second side of the excavation; a form coupled to the frame, the form configured to define at least part of the shape of the concrete footing; a reinforcement structure configured to reinforce concrete, at least part of the reinforcement structure being disposed within the form; and a template defining an inbed pattern over the form. The frame is configured such that the form and the reinforcement structure can be suspended from the frame. The assembly can further comprise at least one inbed, the at least one inbed being releasably coupled to the template. The frame can include at least one opening through which concrete can be placed into the form, at least when the form is suspended from the frame. The reinforcement structure can be releasably coupled, to the frame. The assembly can be configured to allow separation and removal of the form and the frame from the concrete footing without requiring separation of the form from the frame. The template can be removably coupled to the frame. The frame can comprise at least one attachment member configured to couple to the frame and the form. The attachment member can be disposed vertically below the template and spaced apart vertically from the template by a sufficient distance to allow workers' hands to access the space vertically between the attachment member and the template. The assembly can further comprise first and second supports configured to support the frame over the first and second sides, respectively, of the excavation, the supports being adjustable so as to adjust at least the height of the frame over the excavation.

In another aspect, an assembly for use in forming concrete footings comprising means for defining the shape of a concrete pier, means for reinforcing concrete, the reinforcing means being at least partially disposed within the shape-defining means, means for defining an inbed pattern over the shape-defining means, and means for suspending the shape-defining means and the reinforcing means over an excavation. The assembly can further comprise means for removing the shape-defining means and the suspending means from a formed concrete footing without separating the shape-defining means from the suspending means.

In another aspect, a method of forming a concrete footing in an excavation comprises placing a form, a template, a concrete reinforcing structure, and one or more inbeds into an excavation simultaneously. These components can be placed in the excavation simultaneously because the positions of these components can be fixed with respect to one another, at least during this step. Placing these components into an excavation can include suspending the form and/or the concrete reinforcing structure from a frame or other supporting structure. In some embodiments, placing these components into an excavation simultaneously can result in the form being positioned vertically at the desired elevation for the particular construction site. The method also includes adjusting the horizontal position of the form, the template, the reinforcing structure, and the inbed(s). The horizontal positions of these components can be adjusted simultaneously, as the positions of these components can be fixed with respect to one another, at least during this step. The process also includes placing concrete into the form. Placing concrete into the form can include pouring concrete through one or more openings in the frame assembly such that the concrete enters the form. Concrete can be placed until it reaches a desired position with respect to the form, at which point the top of the concrete is also at a desired elevation for the construction site. Optionally, the process can also include releasing the inbeds from the template, separating the form from the hardened concrete, and removing the form and template from the excavation.

In embodiments, a frame can be used to position inbeds over an excavation at the correct elevation and correct horizontal alignment, with all the other components that will be used to construct a footing (aside from the concrete itself) already connected to and suspended from the frame as the inbeds are positioned. In this way, the inbeds can be properly positioned before any concrete is placed. Also, since all of the other components that will form the footing are suspended from the frame below the inbeds as the inbeds are positioned, embodiments avoid the risk of any potentially interfering structures (forms, rebar, etc.) disturbing the positions of the inbeds. By assembling together the form, concrete reinforcement structure, inbed template, and inbeds, and suspending the entire assembly over an excavation together, the process for constructing a concrete footing with properly positioned anchor beds can be greatly simplified.

DETAILED DESCRIPTION OF CERTAIN INVENTIVE EMBODIMENTS

With conventional construction methods, proper alignment of anchor bolts—both within an individual concrete footing, as well as from one footing to the next—is an extremely time- and labor-intensive process. Embodiments of the invention provide systems and methods for constructing footings which allow anchor bolts to be cast in place as the footing is placed. Embodiments thus allow footings to be constructed far more rapidly than with conventional methods while facilitating high-precision placement of anchor bolts.

In some embodiments, a frame system is constructed outside of an excavation and then suspended, using supports, over an excavation. The frame system can include one or more templates for anchor bolts. The frame system can be aligned in proper position and the anchor bolts placed in the frame system before the concrete is placed. In this way, the anchor bolts can be cast in place as the footing is placed.

Figure 1:
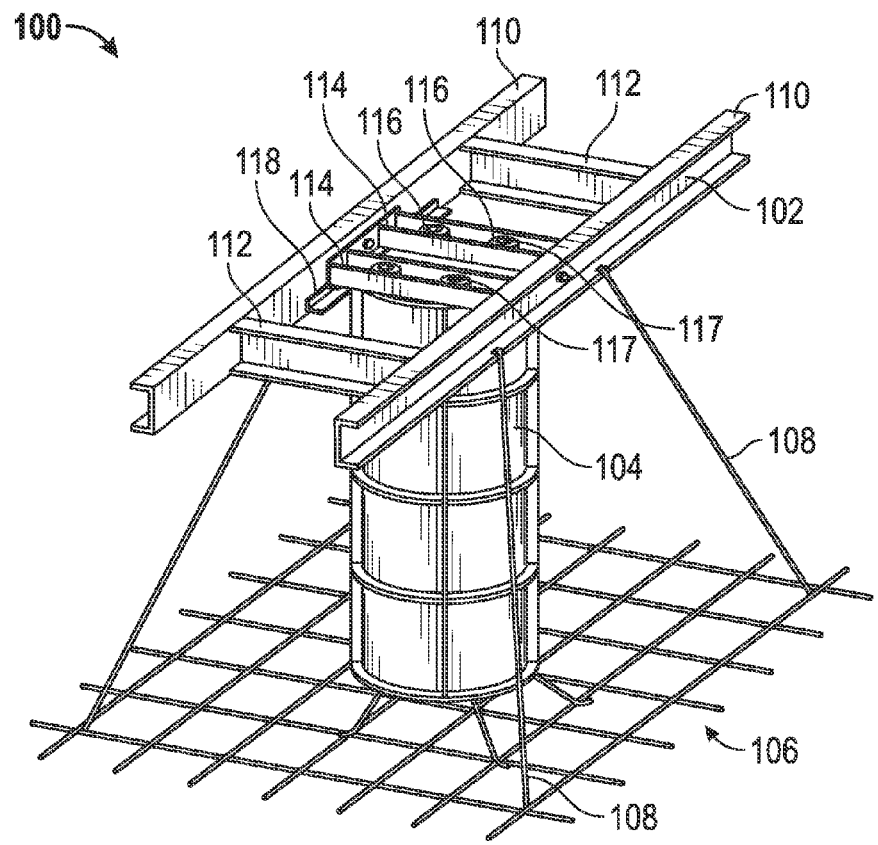
FIG. 1 is a perspective view of a frame system configured in accordance with an embodiment.

FIG. 1 is a perspective view of a frame system 100 configured in accordance with an embodiment. As shown in FIG. 1, the frame system 100 generally includes a frame 102, a form 104, and a mat and cage assembly 106. The frame 102 and the mat and cage assembly 106 can be tied together by ties 108. The ties 108 can include, for example, wires or cables. The frame 102 can include one or more elongate members 110 and one or more cross—members 112 extending between the elongate members 110. The frame 102 can also include one or more template members 114 extending between the elongate members 110. Each of the template members 114 can include one or more openings or holes 116 through which one or more inbeds 117, such as anchor bolts, may be placed. The inbeds 117 can be releasably secured to the template members 114 in any suitable fashion. For example, in some embodiments, the inbeds 117 can be secured to the template members 114 by inserting each inbed 117 through a hole 116 in the template and removably securing the inbed 117 to the template 114 using a nut. In embodiments, the inbeds 117 need not be connected in any way to the mat and cage assembly 106. The template members 114 can be removable and/or replaceable within the frame 102. For example, as shown in FIG. 1, the template members 114 can be removably coupled to the frame 102 using bolts. In addition, the position of the template members 114 can be adjustable within the frame 102. In other embodiments, the template members 114 can be permanently coupled (for example, welded) to the frame 102.

As also shown in FIG. 1, the frame system can include one or more attachment members 118 configured to releasably couple the frame 102 to the form 104. The attachment members 118 can be configured to support and distribute the weight of the form 104 as the form is suspended from the frame 104. The attachment member 118 can also be configured to be rigid in both the longitudinal and transverse directions, so that it resists bending as it supports the weight of the form 104. In the embodiment illustrated in FIG. 1, the attachment member 118 includes a length of angle that forms a flange on the inward-facing surfaces of the elongate members 110, generally below the template members 114. In various embodiments, the attachment members 118 can be integrally formed with the elongate members 110, permanently coupled (e.g., welded) to the elongate members 110, or removably coupled (e.g., bolted) to the elongate members 110.

The frame 102 can be formed from any material suitable for its intended purposes of supporting the weight of the form 104 and the mat and cage assembly 106 and suspending the form 104 and the mat and cage assembly 106 in an excavation. For example, the frame 102 can be formed from metal, such as aluminum C-channel. In some embodiments, the frame 102 (and/or any of its subcomponents) can be formed from 4 inch C-channel, with an overall length of approximately 10 feet and a spacing of about 2 feet between the elongate members 110. In other embodiments, the frame can have any suitable shape and dimensions for the particular application, taking into account the size of the excavations and the form(s) that will be suspended from the frame. For example, the frame can have a length of about 5, 6, 7, 8, 9, 10, 15, or 20 feet, or a length greater than, less than, or within a range defined by any of these numbers. Also for example, the frame can have a width of about 1, 2, 3, 4, 5, 6, 7, 8, 9, or 10 feet, or a width greater than, less than, or within a. range defined by any of these numbers. Also for example, the frame can have a height of about 1, 2, 3, 4, 5, 6, 7, 8, 9, or 10 inches, or a height greater than, less than, or within a range defined by any of these numbers. The form 104 can be formed from any suitable material, such as, for example, wood, cardboard, wax-impregnated cardboard, and/or plastic. The form 104 can be rectangular or cylindrical in cross-section, or can have any other shape suitable for its intended purposes of defining the shape of a concrete pier and containing placed concrete as it hardens. In some embodiments, the form 104 can include two halves which can be clamped (or otherwise coupled) together as unset concrete is being placed into the form. The halves can then be separated from, one another (or "cracked") and removed from the concrete once the concrete has hardened. In some embodiments, the form 104 can be a SONOTUBE® form, available from Sonoco Products Company of S.C., USA, The mat and cage assembly 106 can comprise any suitable material, such as, for example, rebar, and can be formed using known methods. Although illustrated in FIG. 1 with two template members 114 having two openings 116 each (for a total of four inbeds), other embodiments can include 1, 2, 3, 4, or more template members, each designed to accommodate 1, 2, 3, 4, or more inbeds, in any desired pattern, including rectangular, circular, regular, or irregular patterns, as desired for a particular application. In addition, the inbed(s) 104 can be any type of inbeds that may be used, in concrete construction, including anchor bolts, pipes, tubes of any cross-sectional shape, C-channel, or any other type of inbed.

Figure 2A:
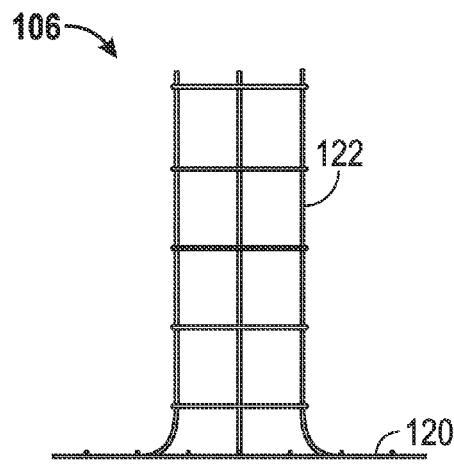
FIG. 2A is a side elevation of the mat and cage assembly shown in FIG. 1.
Figure 2B:
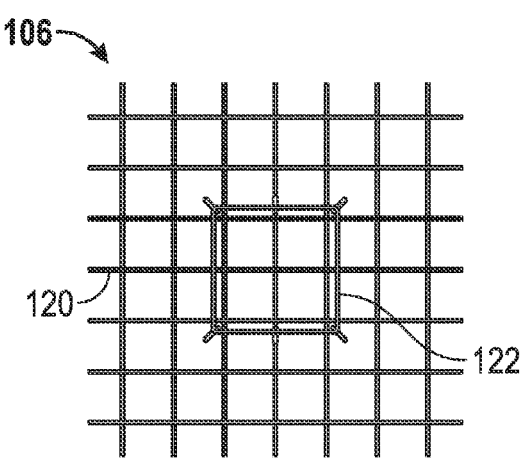
FIG. 2B is a top plan view of the mat and cage assembly shown in FIG. 2A.

FIG. 2A is a side elevation of the mat and cage assembly 106. FIG. 2B is a top plan view of the mat and cage assembly 106. The assembly 106 includes a mat 120 and a cage 122. The mat 120 can include tied rebar configured to reinforce concrete in the lower portion of a footing, and the cage 122 can include tied rebar configured, to reinforce the upper portion (or pier) of a footing.

Figure 3A:
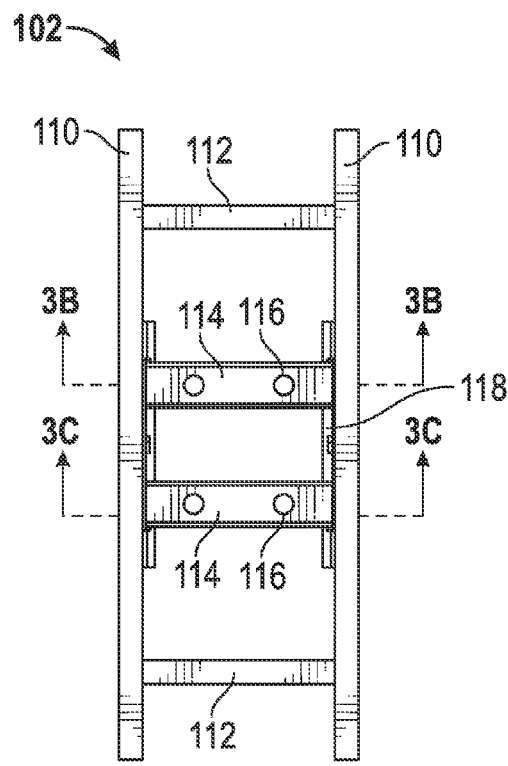
FIG. 3A is a top plan view of the frame shown in FIG. 1.
Figure 3B:
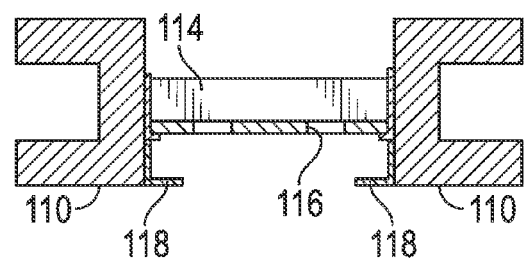
FIG. 3B is a side cross-sectional view of the frame shown in FIG. 3A, taken along line 3B-3B.
Figure 3C:
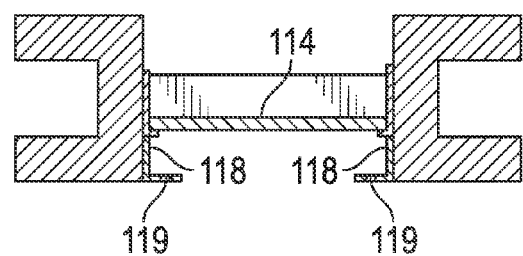
FIG. 3C is another side cross-sectional view of the frame shown in FIG. 3A, taken along line 3C-3C.
Figure 3D:
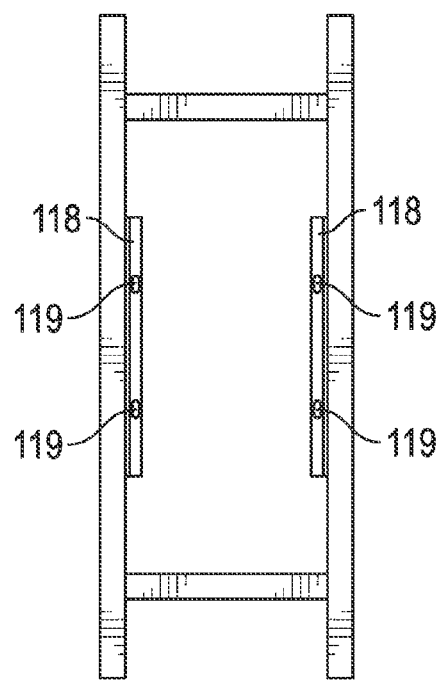
FIG. 3D is a top plan view of the frame shown in FIG. 1, with the template members removed to better illustrate the attachment members.
Figure 4:
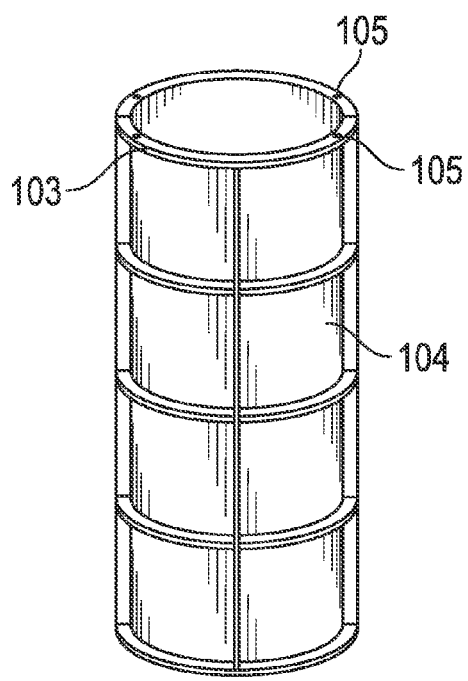
FIG. 4 is a perspective view of the form shown in FIG. 1.

FIG. 3A is a top plan view of the frame 102, illustrating the elongate members 110, the cross-members 112, and the template members 114. FIG. 3B is a side cross-sectional view of the frame shown in FIG. 3A, taken along line 3B-3B, illustrating the openings 116 in the template members 114. FIG. 3C is another side cross-sectional view of the frame shown in FIG. 3A, taken along line 3C-3C, illustrating openings 119 in the attachment members 118. The openings 119 can be configured to align with corresponding openings in the form 104, allowing the frame 102 and the form 104 to be removably coupled to one another, for example using bolts or other types of fasteners. FIG. 3D is a top plan view of the frame shown in FIG. 1, with the template members 114 removed to better illustrate the attachment members 118 and openings 119. As illustrated in FIG. 3D, the openings 119 can have an elongate shape. FIG. 4 is a perspective view of the form 104, illustrating openings 105 in flange 103 of the form 104.

Figure 5:
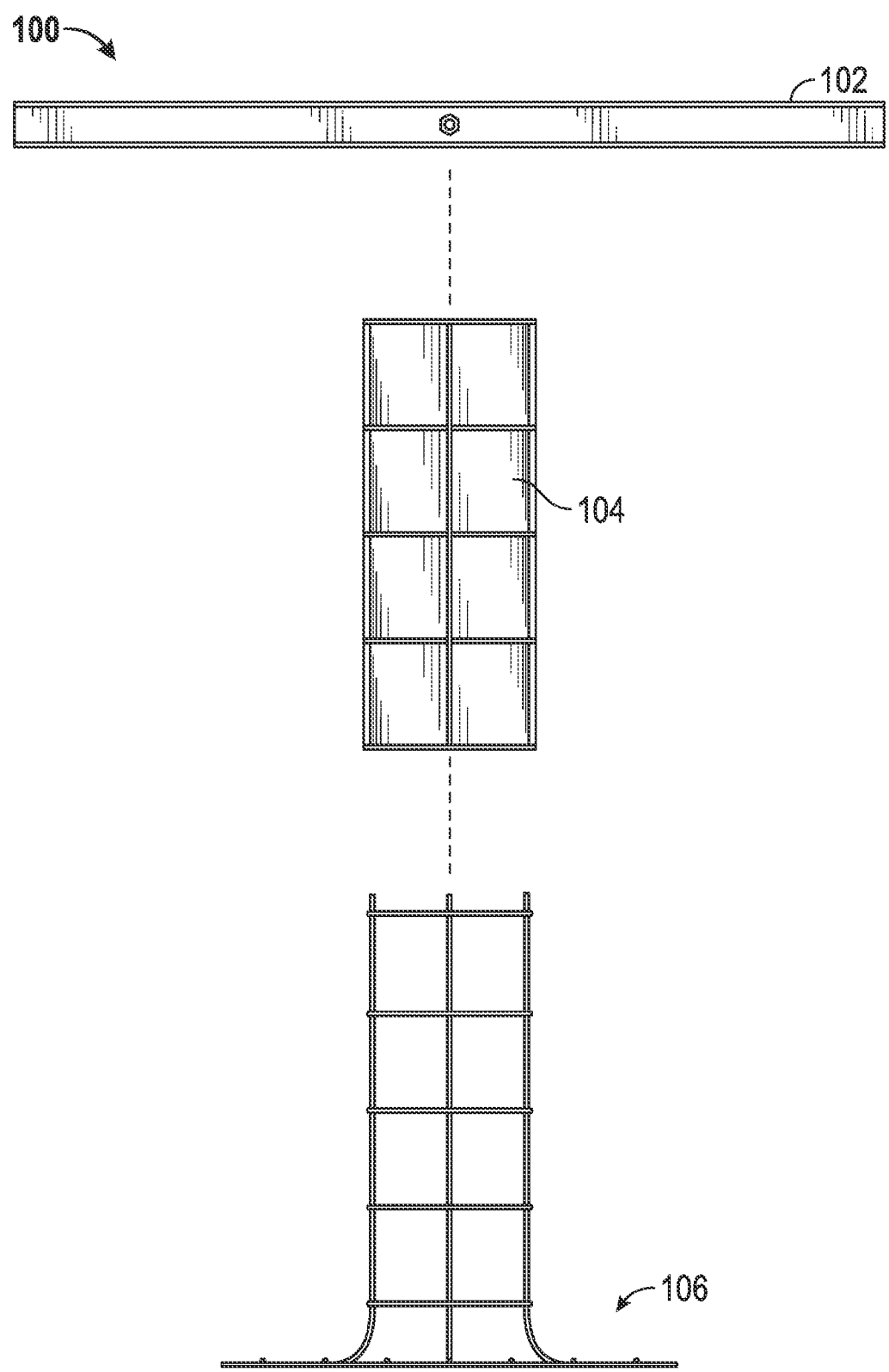
FIG. 5 is a schematic exploded side view of the frame system shown in FIG. 1, shown without the ties.
Figure 6A:
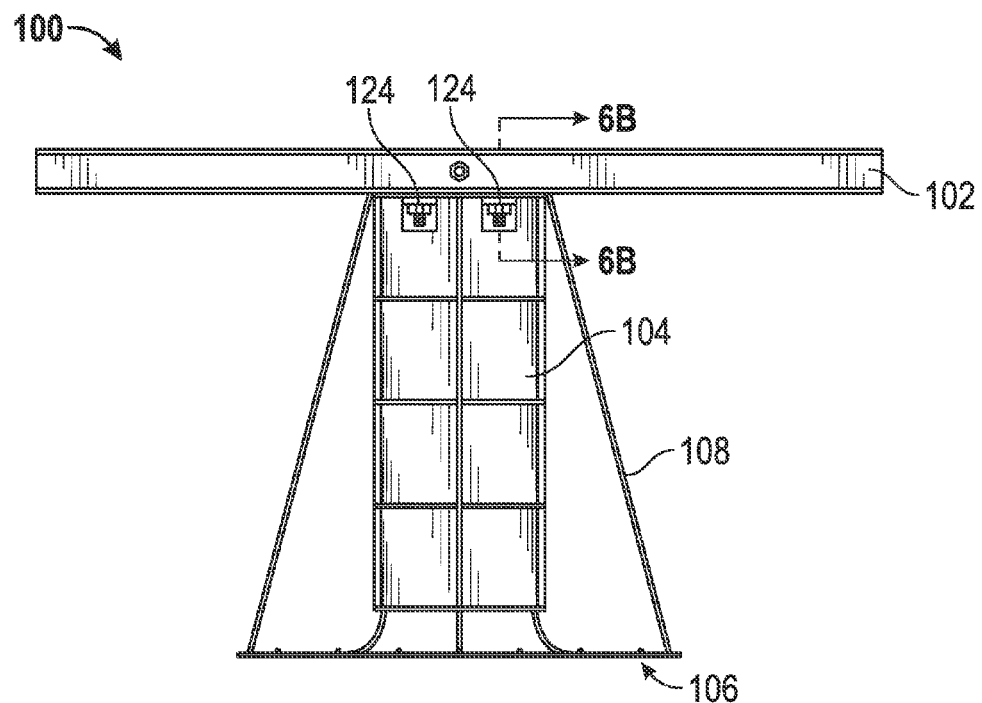
FIG. 6A is a schematic side view of the frame system shown in FIG. 5, shown assembled and with the frame tied to the mat.

FIG. 5 is a schematic exploded view of the frame system 100, shown without the ties 108. FIG. 6A is a schematic side view of the frame system 100, shown assembled and with the frame 102 tied to the mat and cage assembly 106. As shown in FIG. 6A, the frame system 100 can include coupling members 124, such as, for example, bolt clips, which can be configured to removably couple the frame 102 to the form 104.

In some embodiments, a frame system can be assembled above ground, outside of any excavations and, if desired, before any excavations are formed. Assembly of the frame system can include providing a frame, for example as described above in connection with FIG. 1. The frame can include one or more longitudinally-extending structural members, with laterally-extending structural members joining the longitudinal members, for example as illustrated above in connection with FIG. 1. The frame can also include one or more templates extending between the longitudinal members. The template(s) can include holes through which anchor bolts can be placed in a desired pattern or spacing.

Figure 6B:
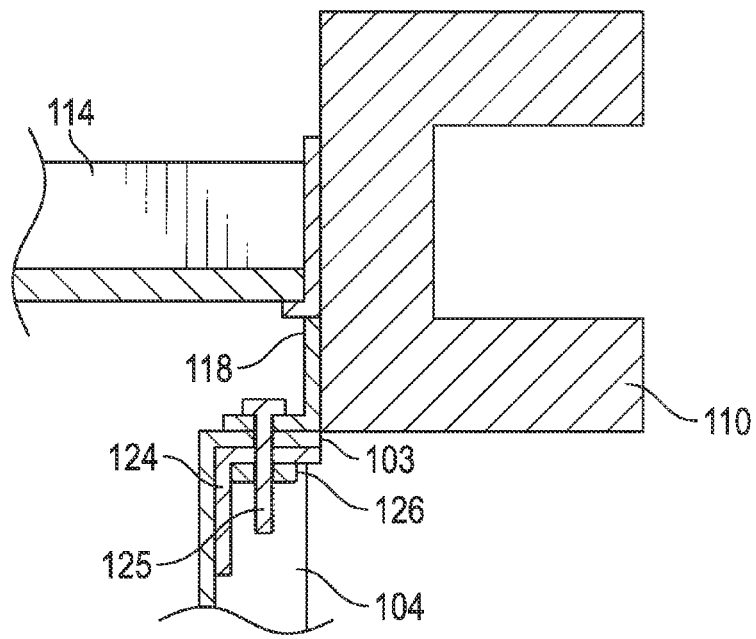
FIG. 6B is a partially cut away cross-sectional view of the system shown in FIG. 6A, taken along line 6B-6B and illustrating one example of how a frame can be coupled to a form.
Figure 6C:
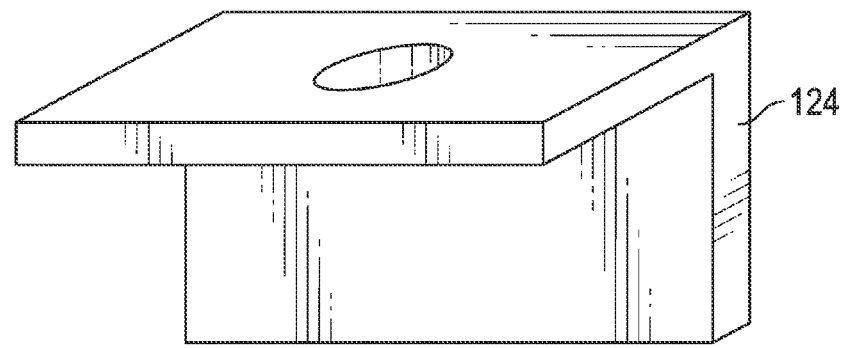
FIG. 6C is a perspective view of one example of a bolt clip that can be used in the system shown in FIG. 6A.

Assembly of the frame system can also include forming a mat and a cage, for example using a rebar tying machine. The size and shape of the mat and cage can be determined using known methods. The cage and mat can then be tied together, also according to known methods. Next, a form (which may also be referred to as a can or cylinder) can be coupled to the frame. The form can be coupled to the frame with the upper end of the form positioned directly under the template(s), with the holes in the template(s) aligned over the top of the form. The form and frame can be coupled in any suitable manner to allow the form to be suspended from the frame in a stable fashion, without unwanted movement of the form. For example, with reference to FIG. 6B, the form 104 and frame 102 can be coupled to one another by aligning the openings 105 in the flange 103 of the form 104 with the openings 119 in the attachment member 118 of the frame 102, and installing a fastener, such as a bolt 125 and a nut 126, through the openings 118 and 105. In some embodiments, the bolt 125 can be a large-threaded bolt so as to resist damage through multiple uses. The bolt clip 124 and the attachment member 118 can serve to distribute forces in the flange 103 in the region of the holes 103. FIG. 6C illustrates the bolt clip 124 in further detail.

Next, the form (along with the frame to which it is coupled) can be placed over the cage, either by hand or using suitable equipment. Finally, the mat can be tied, to the frame, for example using wires or cables. The mat and frame can be tied together at any suitable locations along the mat and/or frame and in any suitable fashion to lend stability to the frame system. Finally, anchor bolts can be placed in the template(s), at the top of the form. In this way, the anchor bolts are suspended (through the template(s)) in position at the top of the form, before the form and frame are set in an excavation and before any concrete is placed.

In some embodiments, one or more footings can be constructed using a frame system, such as the frame system 100 described above. One such embodiment is described with reference to FIG. 7. First, a construction site can be prepared according to known methods, for example using hubs and stakes with standard surveying equipment to define the desired excavation and anchor bolt layout. Next, one or more excavations 200 can be dug out using suitable equipment, such as, for example, a backhoe. The excavations can be compacted at the bottom to eliminate crumbs. A grade rod can then be placed in each excavation to check elevation.

Figure 7:
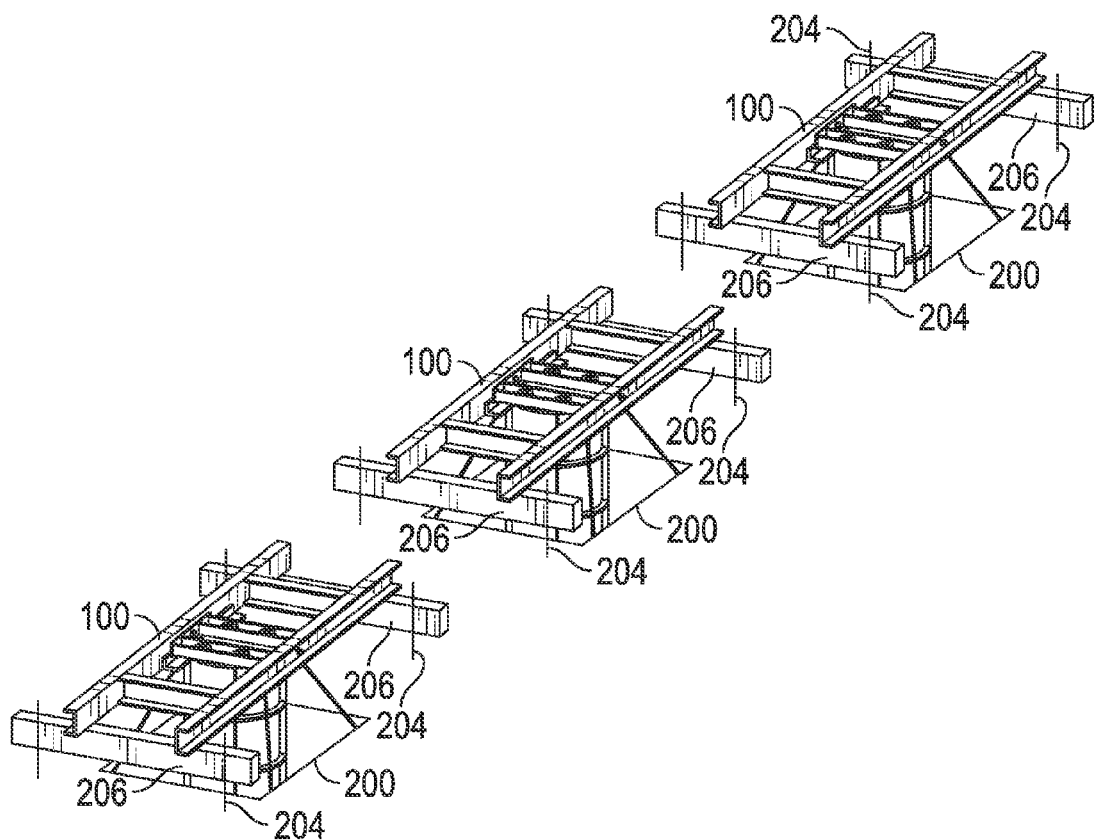
FIG. 7 is an illustration of one step in a process of constructing concrete footings in accordance with an embodiment, using the frame system illustrated in FIG. 1.

Next, grade pins 204 can be set in the ground, outside of each excavation 200. The grade pins can be set using suitable equipment, such as a backhoe. In some embodiments, the grade pins 204 can be steel pins, such as ¾"-1" diameter steel pins. In some embodiments, as illustrated in FIG. 7, the grade pins 204 can be set on opposing sides of each excavation 200, just in from the corners of each excavation 200.

Once the grade pins 204 are set, grade beams 206 can be set at an appropriate elevation on the grade pins 204, on opposing sides of each excavation 200. The appropriate elevation can be determined based on the designed finished elevation of the pier (that is, the finished elevation of the foundation) that will be installed. In some embodiments, a laser can (e.g., a laser beacon) can be used to set the grade beams 206 at the appropriate elevation. The grade beams 206 can be, for example, 2"×8" beams made of wood or any other material. The grade beams 206 can be secured to the pins 204 using screws or other suitable fasteners. Next, the centers of the grade beams 206 can be marked. The centers can be marked in any suitable fashion, for example using survey equipment, such as a digital theodolite. A grade rod can be used to check the elevation of the grade beams 206. If desired, multiple excavations 200 can be prepared in this manner before proceeding to the next step.

Figure 8A:
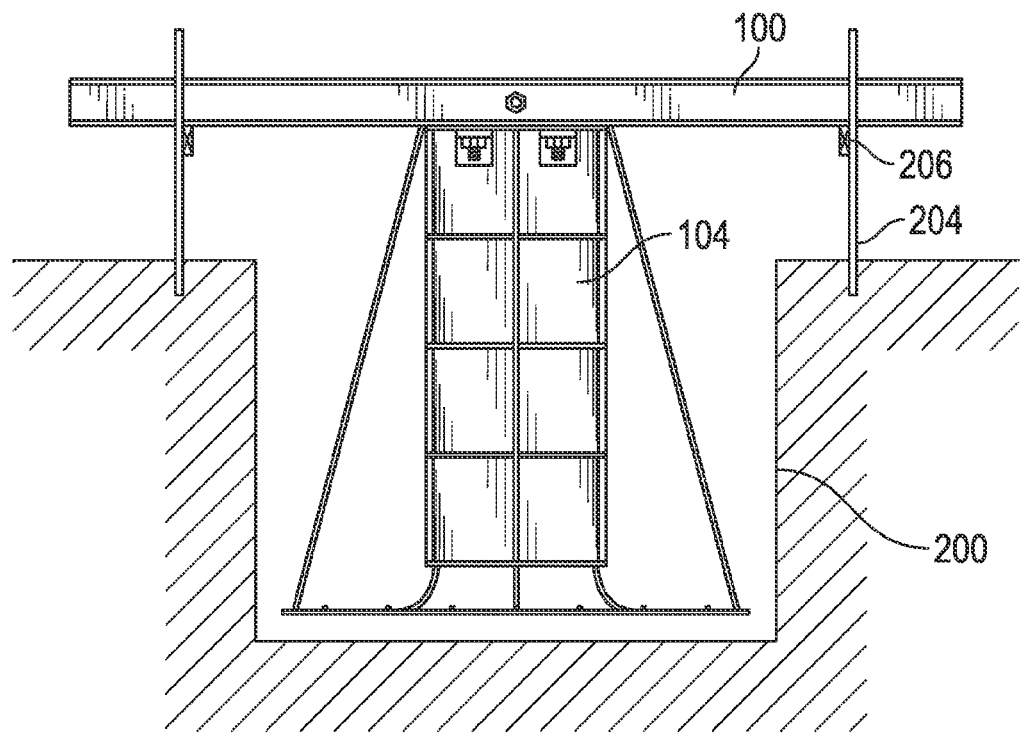
FIG. 8A is a side sectional view illustrating a frame system suspended in an excavation, in accordance with one embodiment.

Next, as illustrated in FIG. 8A, the pre-assembled frame system 100 can be set in the excavation 200 (either by hand, or using machinery), with the ends of the frames 102 resting on the grade beams 206. In this way, both the form 104 and the mat and cage assembly 106 are suspended in the excavation 200, instead of resting on the bottom of the excavation 200 (or on supports at the bottom of the excavation) as in conventional methods. In embodiments, setting the frame system 100 in the excavation on the grade beams 206 can result in the top of the form 104 (or a pre-selected "top-of-pier" location disposed along the height of the form) being positioned, at the desired elevation for the construction site, without requiring any further vertical adjustment of the form 104, template 114, or inbeds 117. If desired, multiple frame systems 100 can be set in multiple excavations 200 in this step.

Then, the position of frame systems 100 in a series of excavations 200 can be checked and adjusted if necessary. The lateral position of a frame system 100 can be checked, for example using the marked centers of the grade beams 206 to make sure that the frame system is in the appropriate lateral position and moving the frame system 100 laterally if necessary. In a series of frame systems 100, the lateral positions can be adjusted in this manner to ensure that the each frame system 100 in the series is aligned in the longitudinal direction. Also, the spacing between adjacent frame systems 100 (i.e., center-to-center or template-to-template (e.g., end-to-end or side-to-side) spacing of adjacent frame systems 100 in the longitudinal direction) can be checked, for example using tack lines to pull distances from a hub and moving the frame systems 100 longitudinally if necessary.

Figure 8B:
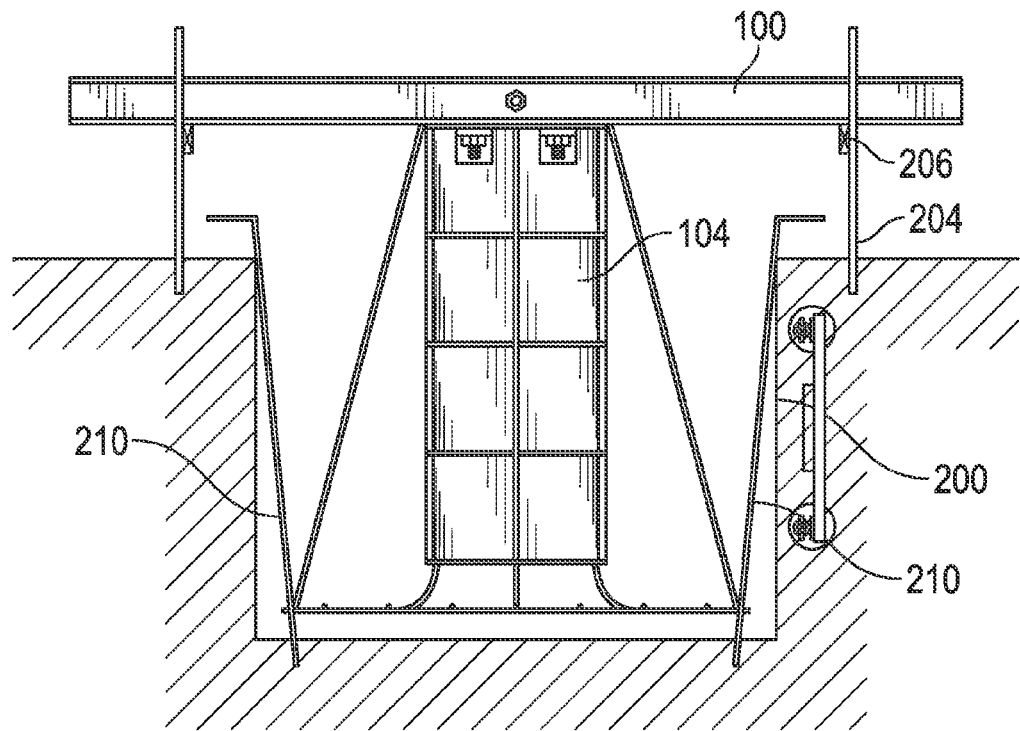
FIG. 8B is a side sectional view illustrating a frame system suspended in an excavation, with stabilizing pins installed in the excavation in accordance with another embodiment.
Figure 8C:
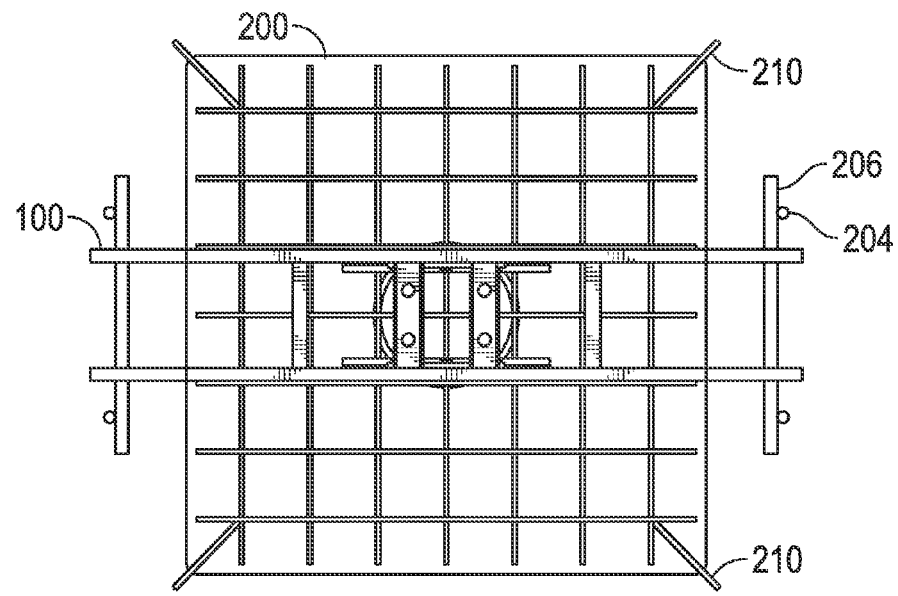
FIG. 8C is a top plan view further illustrating the frame system and stabilizing pins shown in FIG. 8B.

When each frame system 100 is properly positioned in its corresponding excavation 200, form oil can be sprayed on the form 104, and flowable concrete can be placed into the form 104 until the concrete covers the mat 120 at the bottom of the excavation 200 and reaches the lower end of the form 104 to create the footing. In some embodiments, as illustrated in FIGS. 8B and 8C, one or more stabilizing pins 210 can be inserted into the soil at the bottom of the excavation before the concrete is placed, in suitable locations about the mat 106 (such as, for example, the corners of the mat 106), to limit or prevent movement of the mat as concrete is placed. The pins 210 can be removed once the concrete is placed, cleaned, and re-used. In some embodiments, the pins 210 can be, for example, ⅝ inch diameter smooth steel bars.

At this stage, the placed concrete can be allowed to set up for a suitable time, such as, for example, between 2 and 4 hours or more. The appropriate time can vary depending on temperature, humidity, and the particular concrete mix. Then, without needing to finish the upper surface of the placed concrete, additional concrete can be placed into the form 104 to create the pier. In this way, the anchor bolts or other inbeds (which are suspended from the template(s) 114 in the frame 102 at the top of the form 104) are cast in place, having been properly positioned when the frame system 100 was properly positioned in the excavation 200.

In some embodiments, the concrete for the footing and the pier can be placed monolithically, that is, without waiting for the footing concrete to set up before placing the pier. In some such embodiments, for example as illustrated in FIG. 8E, a flange 107 can be provided at the bottom of the form 104 to help facilitate such monolithic placement. The flange 107 can encircle the bottom of the form 104, sloping downward somewhat as it extends away from the form so as to provide additional structural support for the flowable concrete as it is monolithically placed. The flange 107 can be fastened to the form 104 in any suitable fashion, including, for example, using bolts. The flange 107 can be formed from any suitable material, and can have any suitable dimension and slope selected for the viscosity of the concrete being used. For example and without limitation, in some embodiments, the flange can extend about 4 inches to about 6 inches outward from the form and slope downward 1 inch over that length. In some embodiments, the footing concrete can be placed through the form and the flange, vibrated, and then the pier concrete can be placed immediately afterward, without waiting for the footing to set up.

Next, the upper surface of the formed pier can be finished smooth, according to known methods. In some embodiments, the provision of a space vertically between the template members 114 and the attachment members 118 can allow working space at the top of the formed pier, so that hands and tools can access the top of the formed pier while the frame system 100 is still in place. The concrete can then be allowed to harden completely, for example, for between 3 and 16 hours or longer. In some embodiments, the concrete can be configured to harden more rapidly, e.g., within 4 to 6 hours, or faster.

When the concrete has fully hardened, the frame 102 and the form 104 can be removed from the pier. In some embodiments, the removal can involve clipping of the ties 108 which connected the mat 120 to the frame 102 and removal of the nuts (or other structure) which secured the anchor bolts 116 (or other inbeds) to the template members 114. The removal can also involve loosening of the nuts 126 which secure the form 104 to the frame 102 (see, e.g., FIG. 6B). Once the nuts 126 are loosened, the bolts 125 can travel in the elongated openings 119 of the attachment members 118 (see, e.g., FIG. 3D), allowing the parts of the form 104 to be cracked apart and separated from the formed concrete, without necessarily having to separate the form 104 from the frame 102. Of course, if desired, the nuts 126 and bolts 125 can be removed entirely, so that the form 104 and frame 102 can be separated before or during the removal of the form 104 from the formed pier. The top of the pier can be rubbed and the anchor bolts can be cleaned.

Optionally, the frame 102 and form 104 can be cleaned and re-assembled with a new mat and cage assembly 106, for example as described above, to construct another frame system 100 for use in another excavation 200. Once all of the footings have been cast, the excavations 200 can be back-filled, compacted, and cleaned according to known methods.

Figure 8D:
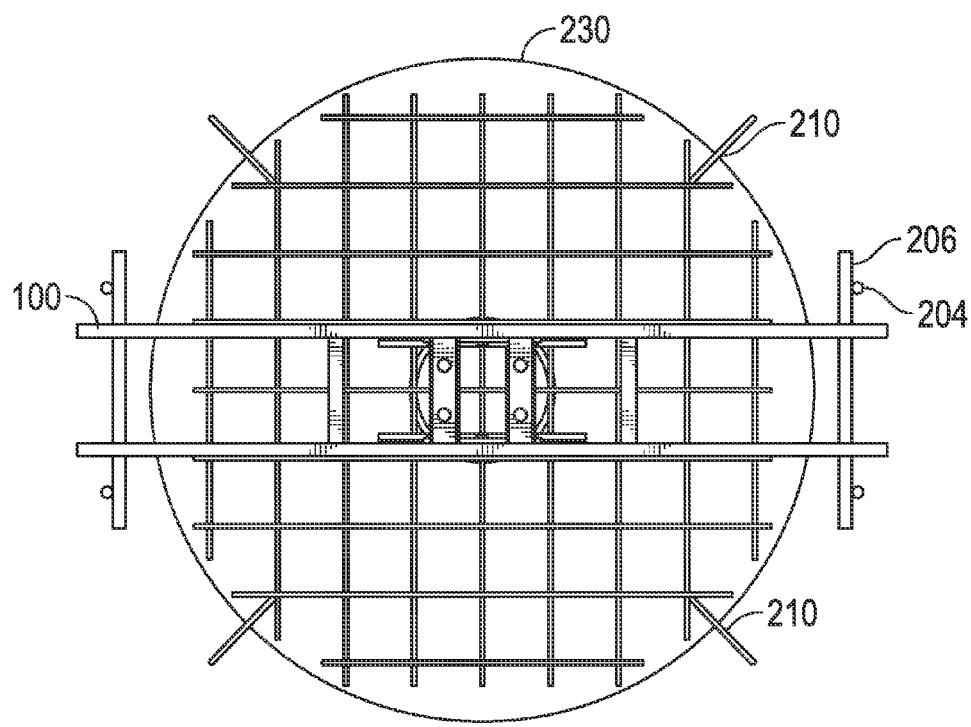
FIG. 8D is a top plan view of a frame system suspended over another excavation, in accordance with a further embodiment.
Figure 8E:
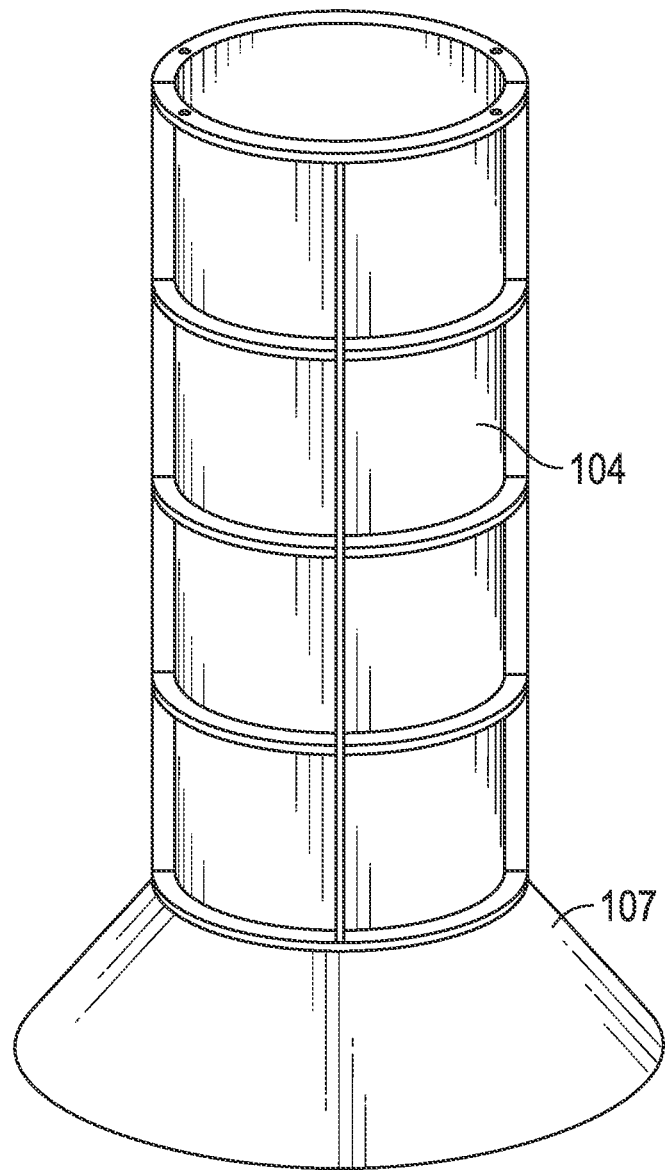
FIG. 8E is a perspective view of a form adapted for monolithic placement of concrete in a spread footing, in accordance with another embodiment.

As illustrated in FIG. 8D, embodiments can also be used to advantage not just in constructing spread footings, but also in the construction of other types of footings, such as a drilled pier in a drilled circular excavation 230. Embodiments can also be used in constructing bell footings and other types of concrete structures.

Figure 9A:
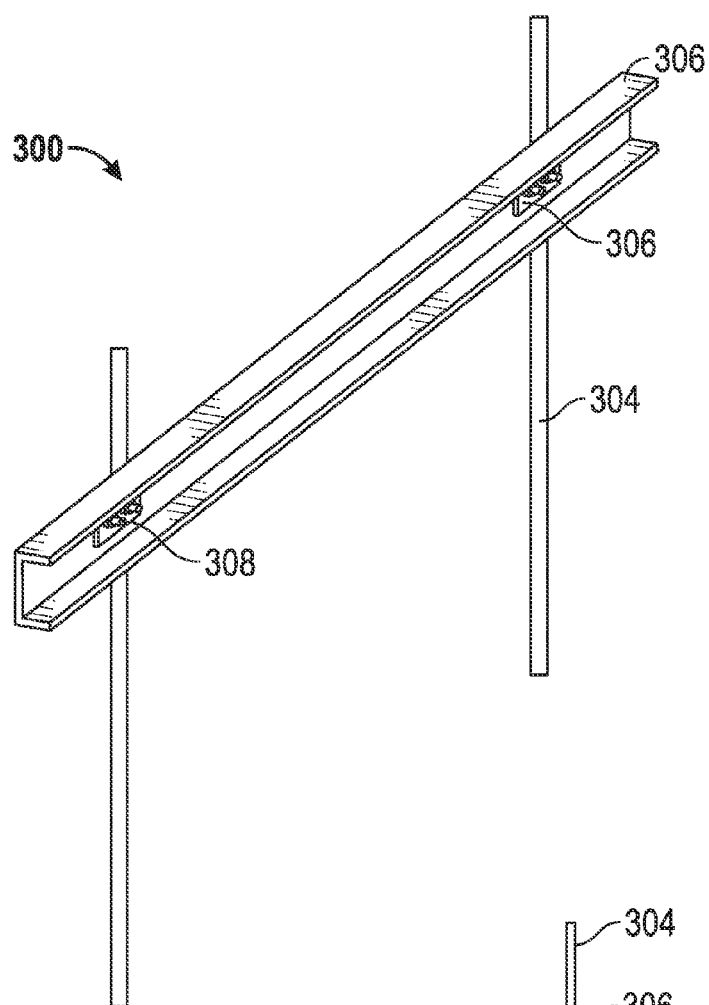
FIG. 9A is a perspective view of a grade beam assembly configured for use with an embodiment.
Figure 9B:
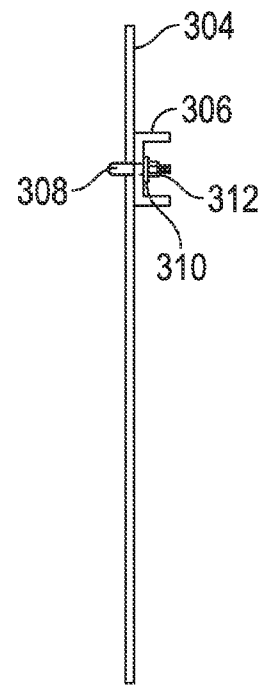
FIG. 9B is a side view of the grade beam assembly shown in FIG. 9A.
Figure 9C:
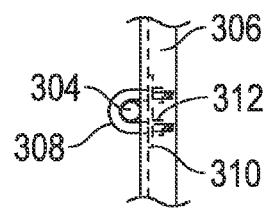
FIG. 9C is a partially cut away top view of the grade beam assembly shown in FIG. 9A.

With, reference now to FIGS. 9A-9C, some embodiments can employ other structures besides conventional grade beams 206 and pins 204 to support a frame system 100 over an excavation. FIGS. 9A, 9B, and 9C show perspective, side, and partially cut away top views, respectively, of grade structures 300 that can be formed entirely of metal. The structures 300 can include grade pins 304 and a beam member 306 formed of metal, such as aluminum C-channel. The beam member 306 can be coupled to the grade pins 304 using one or more fasteners 308. In some embodiments, as illustrated in FIGS. 9A-9C, the fasteners can be U-bolts 308 which can be tightened, against the surface of the beam member 306 using nuts 312 to form a compression fit against the grade pins 304. Washers 310 can be provided to distribute forces in the beam member 306 in the region of the fasteners 308. Such a configuration can allow adjustment of the beam members 306 vertically with respect to the pins 304, while also eliminating components made of wood or other material which could potentially deteriorate over time.

Figure 10A:
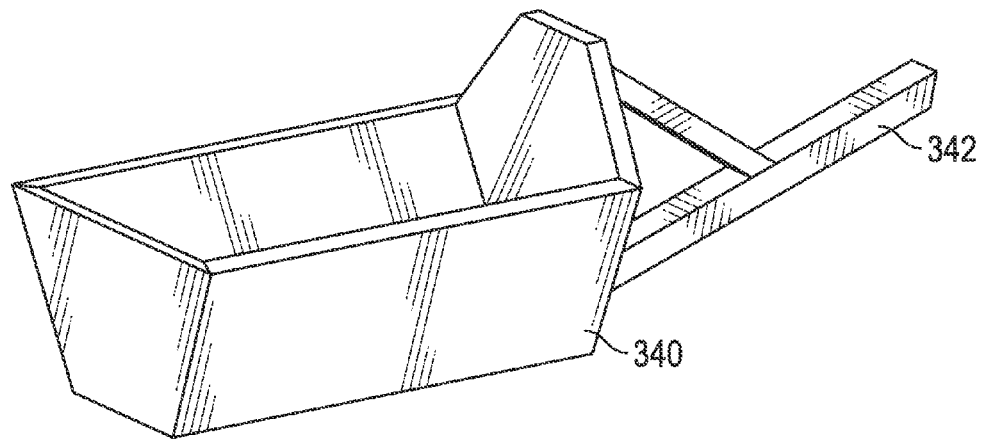
FIG. 10A is a perspective view of a hopper configured in accordance with an embodiment.
Figure 10B:
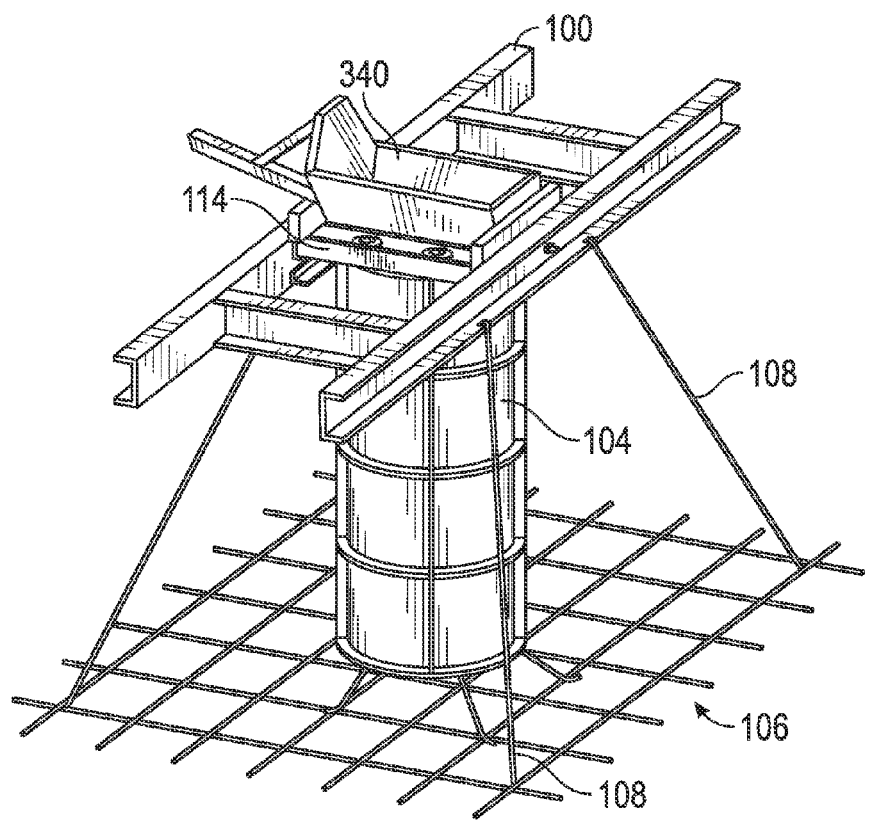
FIG. 10B is an illustration showing the hopper of FIG. 10A in use with a frame system, in accordance with an embodiment.

FIG. 10A illustrates one example of a hopper 340 that can be used, in some embodiments. The hopper 340 can be formed from any suitable material, including, for example, wood, and can be have any suitable configuration to funnel concrete toward the center of a form. As shown in FIG. 10A, the hopper 340 has a generally rectangular inlet that tapers toward, its outlet at the bottom of the hopper 340. The hopper 340 can also include a handle 342 that facilitates movement of the hopper 340 from one site to the next. FIG. 10B shows an example of the hopper 340 in place at the top of the frame system 100. As can be seen in FIG. 10B, the hopper 340 can sit at the top of the frame 102, between the two template members 114 and directly above the form 104. In some embodiments, spacer blocks 344 can be placed at each end of the hopper 340, between the ends of the hopper 340 and the elongate members 110 forming the frame 102. By such a configuration, the outlet of the hopper 340 can be positioned above the central region of the form 104 and away from the anchor bolts 116, avoiding unwanted splashing and/or dripping of concrete onto the frame 102, the anchor bolts 116, or the inner surfaces of the form 104 as the concrete is being placed.

Figure 11A:
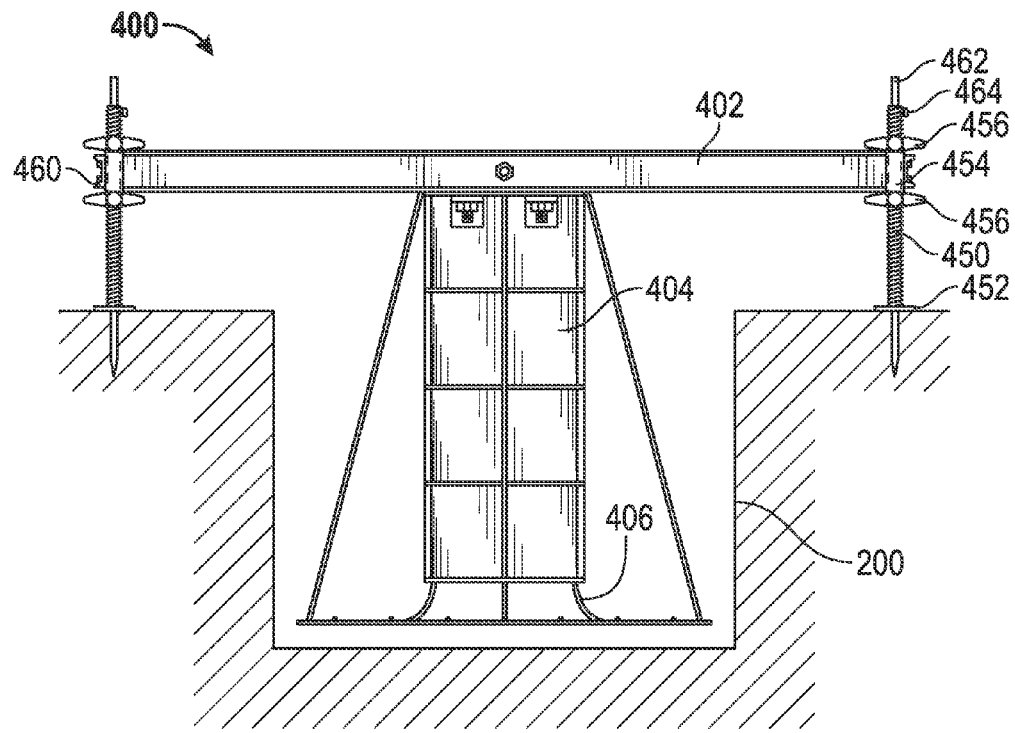
FIG. 11A is a side sectional view illustrating a frame system suspended in an excavation, in accordance with another embodiment.

FIG. 11A shows a frame system 400 configured in accordance with another embodiment. The frame system 400 can generally include a frame 402, a form 404, and a mat and cage assembly 406. The frame 402, the form 404, and the mat and cage assembly 406 can comprise any materials and can have any configuration suitable for their intended purpose. For example, the frame 402, the form 404, and the mat and cage assembly 406 can have a similar configuration and connection as the frame 102, the form 104, and the mat and cage assembly 106 described above in connection with FIGS. 1-6.

Figure 11B:
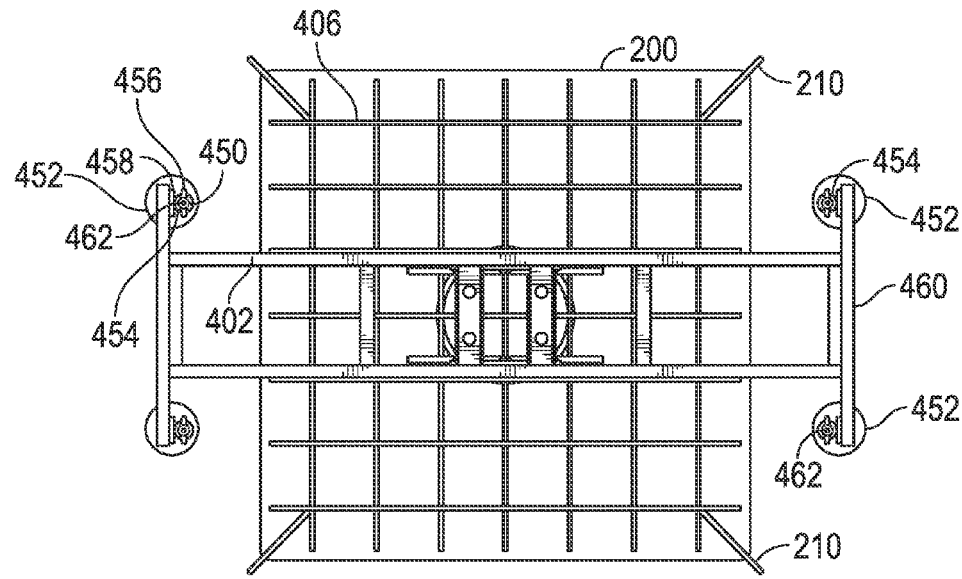
FIG. 11B is a top plan view illustrating the system of FIG. 11A.
Figure 11C:
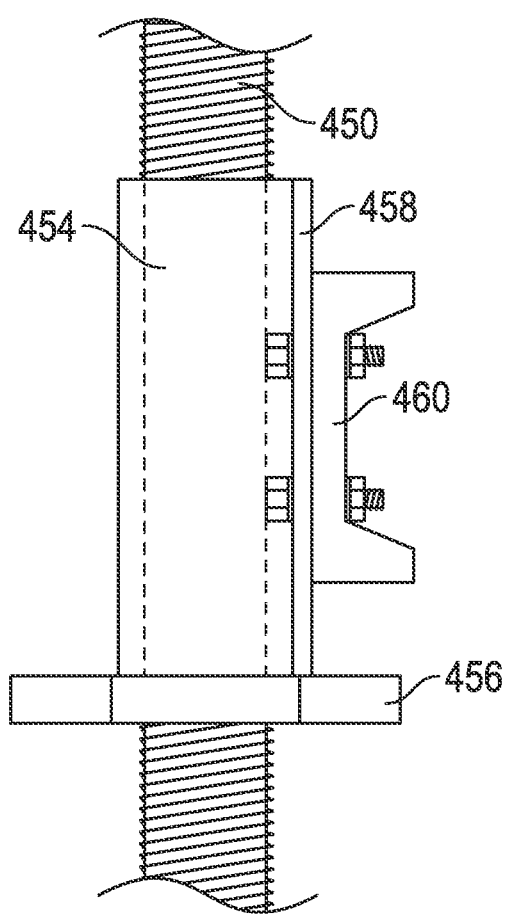
FIG. 11C is a close-up side view illustrating in further detail the portion of FIG. 11A indicated by line 11C-11C.

In addition to these components, the frame system 400 can include supports 450 configured to allow vertical movement of the frame 402 relative to the supports 450 while limiting lateral movement of the frame 402 relative to the supports 450. In some embodiments, the supports 450 can be configured similar to scaffold shoes; i.e., they can include externally-threaded pipe extending from feet 452. In some embodiments, the supports 450 can be coupled to the frame 402 by inserting the supports 450 through sleeves 454 disposed on or near the ends of the frame 402. Adjustment members 456, such as, for example, wingnuts, can be disposed along each of the supports 450, and can be configured to allow adjustment and maintenance of the vertical position of the frame 402. In some embodiments, the sleeves 454 can be coupled to the frame 402 at mounting plates 458. The mounting plates 458 may be connected directly to the frame 402 or, as illustrated in FIG. 11B, the mounting plates 458 can be connected to extensions 460 that are connected to the frame 402, to facilitate desired spacing of the supports 450 from one another at each end of the frame 402 (and, accordingly, at each end of an excavation), FIG. 11C is a close-up side view showing in detail the connection between the support 450, the sleeves 454, the mounting plates 458, and the extensions 460 in the embodiment illustrated in FIGS. 11A and 11B. FIG. 11C also illustrates an adjustment member 456 supporting the sleeve 454 from below, thus limiting downward movement of the sleeve 454 (and the frame coupled to the sleeve 454).

In some embodiments, the supports 450, the sleeves 454, the mounting plates 458, and the extensions 460 can all be formed from the same or different metals. For example, the extensions 460 can be formed from aluminum C-channel. In various embodiments, the sleeves 454 can be permanently coupled or removably or adjustably coupled to their respective mounting plates 458. The mounting plates 458 can be permanently coupled (e.g., welded) or removably coupled (e.g., bolted) to the extensions 460. In some embodiments, the sleeves 454 can be directly coupled to the frame 402 or to the extensions 460, without the use of a mounting plate.

The frame system 400 can be particularly advantageous in very large projects, allowing dozens or even hundreds of footings to be constructed very rapidly and in proper alignment without requiring separate grade beams and pins to be set at each excavation. In use, the entire frame system 400, including the supports 450 and the extensions 460, can be lifted and transported, from excavation to excavation (e.g., using a forklift). Once the system 400 is set down, with the supports 450 resting on the ground outside of an excavation and with the form 404 and mat and cage assembly 406 suspended from the frame 402 into the excavation, the system 400 can be moved into proper alignment (e.g., using hubs and tack lines according to known methods). The frame can be adjusted to grade using adjustment members 456 to limit downward and upward movement of the frame 402 once it is in position. Stabilization pins 462 can be inserted through each support 450 and into the ground to prevent lateral movement of the frame system 400. Once inserted, the stabilization pins 462 can be clamped to the supports 450 using a clamp 464, such as, for example, a locking bolt. The use of such a clamp 464 can help limit or prevent unwanted vertical lift of the frame system 400 as concrete is being placed.

With the frame system 400 in its desired position, concrete can be placed to construct the footing in generally the same manner as described above in connection with FIGS. 1-8E. After the footing is formed, the pins 462 can be pulled out, and the frame 402 and form 404 can be separated from the footing in generally the same manner as described above in connection with FIGS. 1-8E. The frame system 400 (including the supports 450 and extensions 460) can then be lifted and moved to another excavation.

Figure 12:
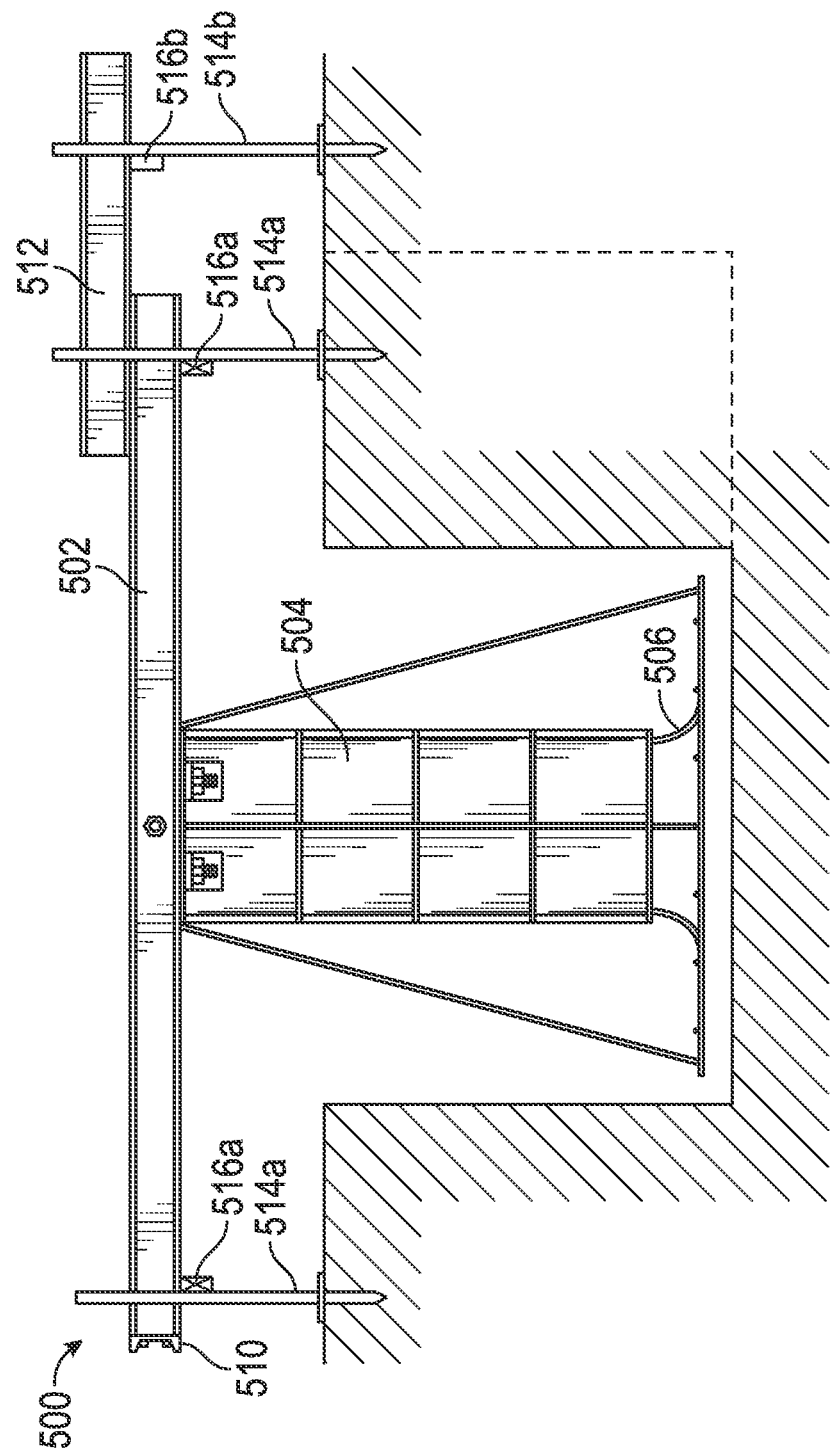
FIG. 12 is a side sectional view illustrating a frame system suspended in an excavation, in accordance with another embodiment.

Although the examples of frame systems discussed above illustrate frames supporting only one form and mat/cage assembly, various embodiments can be adapted for use with multiple forms and mat/cage assemblies. For example, FIG. 12 illustrates a frame system 500 having multiple forms 504 and mat/cage assemblies 506 suspended from the frame 502 in the same excavation. In FIG. 12, two forms/assemblies 504/506 are visible left to right, across the width of the page. An embodiment comprising multiple forms/assemblies arranged in a row along a single frame can be used to advantage in, for example, an installation of a solar parabolic trough. Additional piers can be installed in the same excavation (atop the same footing) in an array by joining together multiple frames side-to-side. For example, as illustrated in the leftmost portion of FIG. 12 (in which only the frame 502 in the front is visible), multiple frames 502 can be joined together (into the page) in any suitable fashion, by connecting the ends of the frames 502 with connecting members 510 that are bolted or otherwise secured to the ends of the frames 502. Connecting members 510 can comprise, for example, C-channel. As illustrated in the rightmost portion of FIG. 12, a given frame system 500 can also be adapted to extend across a larger excavation (illustrated in dashed lines) by connecting one or more extensions 512 to one or both ends of the frame system 500, so that the ends of the extension 512 can be supported by grade beams 516(b) and pins 514(b) set outside the larger excavation (instead of grade beams 516(a) and 514(a) which are illustrated, for the smaller excavation)

Figure 13:
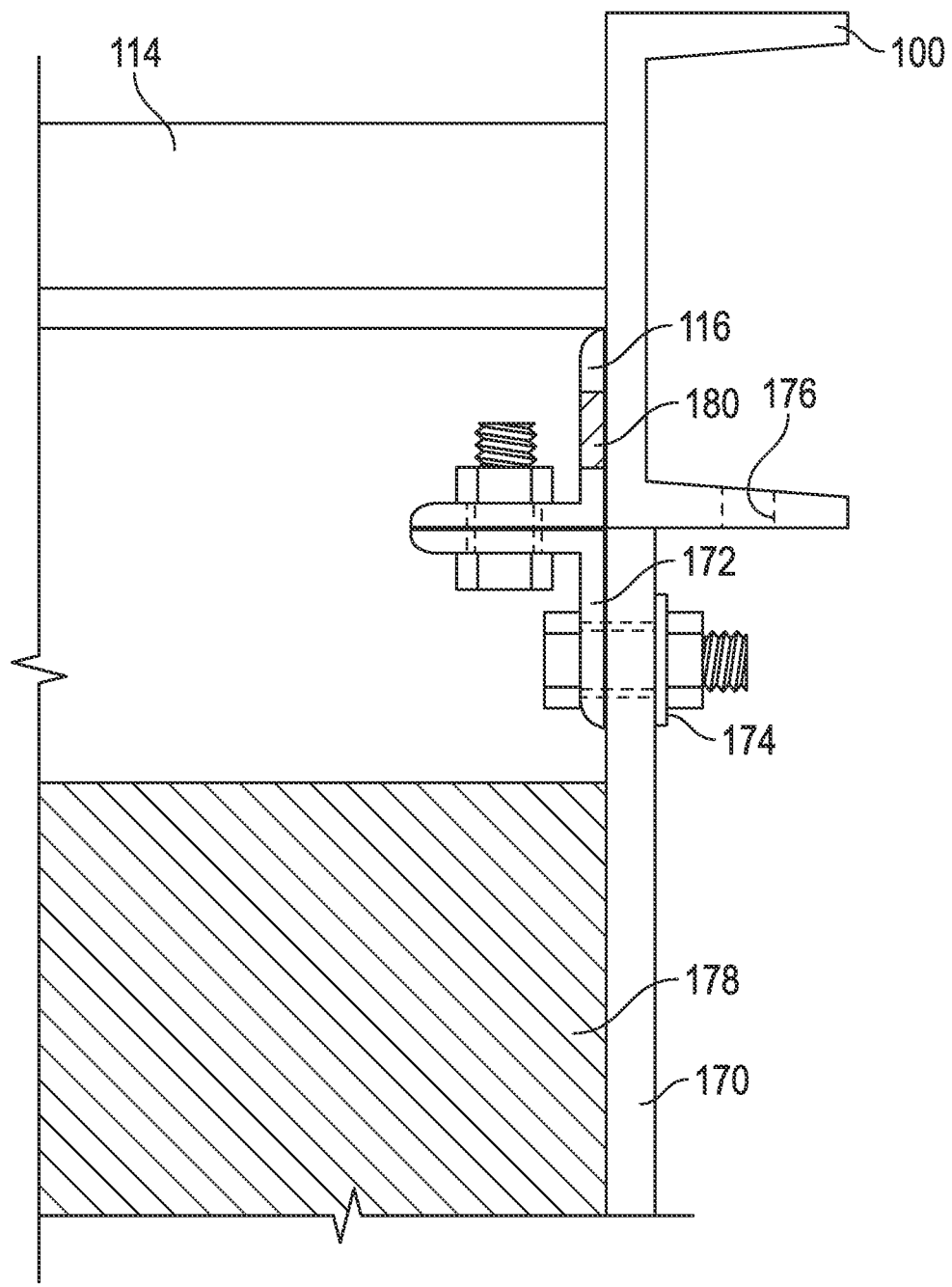
FIG. 13 is a side detail view illustrating another example of how a frame can be coupled to a form, in accordance with an embodiment.

FIG. 13 shows an example of how the frame system 100 illustrated in FIGS. 1A-3D can be adapted for use with a different kind of form than the form 104. In the embodiment illustrated in FIG. 13, the form 170 can be a SONOTUBE® form, or other cardboard-based form, without a flange like the form 104 illustrated in FIG. 4. As shown in FIG. 13, the form 170 can be coupled to the attachment member 118 of the frame system 100 using one or more adapters 172, which can be angles or clips having a similar configuration to the bolt clip 124 illustrated in FIG. 6C. The adapters 172 can be configured such that a vertically-extending leg of the adapter 172 can be coupled to the inside of the wall of the form 170 at the top of the form 170 (e.g., using a nut and bolt as illustrated), and so that a horizontally-extending leg of the adapter forms a flange that can be aligned with and coupled to the attachment member 118. As shown in FIG. 13, a washer 174 can be used on the outside of the form 170, between the form and the nut, to distribute forces on the form where the adapter 172 couples to the form 170. In some embodiments, for example embodiments employing relatively larger forms 170, the adapter 172 can couple to the elongate member 110 (e.g., to the lower leg of a C-channel) instead of to the attachment member 118. The elongate members 110 can include one or more openings 176 to facilitate such a configuration. In FIG. 13, concrete inside the form 170 is illustrated by region 178. Region 180 illustrates the coupling (e.g., a plug weld) between the attachment member 118 and the adapter 172.

Figure 14:
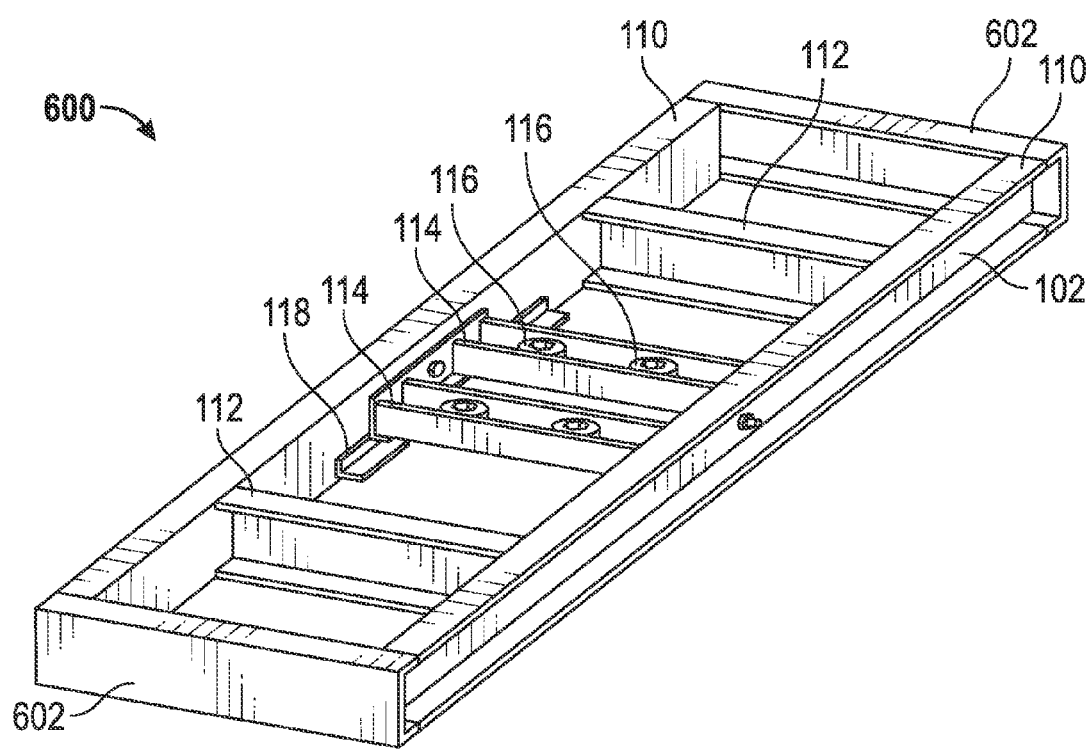
FIG. 14 is a perspective view illustrating another example of a frame configured, in accordance with an embodiment.

FIG. 14 is a perspective view illustrating an example of a frame 600 configured in accordance with another embodiment. In addition to elongate members 110, crossmembers 112, template members 114, and attachment members 118 as described above in connection with FIG. 1, the frame 600 also includes end members 602 disposed on each end of the frame 600. As shown in FIG. 14, the end members 602 can connect the elongate members 110 at each end of the frame 600, providing additional structural integrity to the frame 600 and also facilitating handling of the frame 600. The end members 602 can also facilitate measuring of end-to-end distances between adjacent frames 600 in a series of frames 600 (see, e.g., FIG. 7). In some embodiments, the horizontal position of the frames 600 (in the lengthwise direction) can be adjusted after their vertical position is set (either by setting the frame 600 on grade beams or by setting the frame 600 on adjustable supports as described above in connection with FIGS. 11A and 11B) by measuring the end-to-end distances between end members 602 of adjacent frames 600. Since the end-to-center length of the frames 600 (i.e., the distance between the end of the frames and the location along the frames where the form, template, and inbeds are centered) is a known quantity, the end-to-end distances between adjacent frames can be used to move the form and the inbeds in the template into proper horizontal position. In some embodiments, the side-to-side distances between adjacent frames in the cross-wise direction (i.e., a horizontal direction perpendicular to the lengthwise direction) can also be used to move the form and the inbeds in the template into proper horizontal position.

Figure 15:
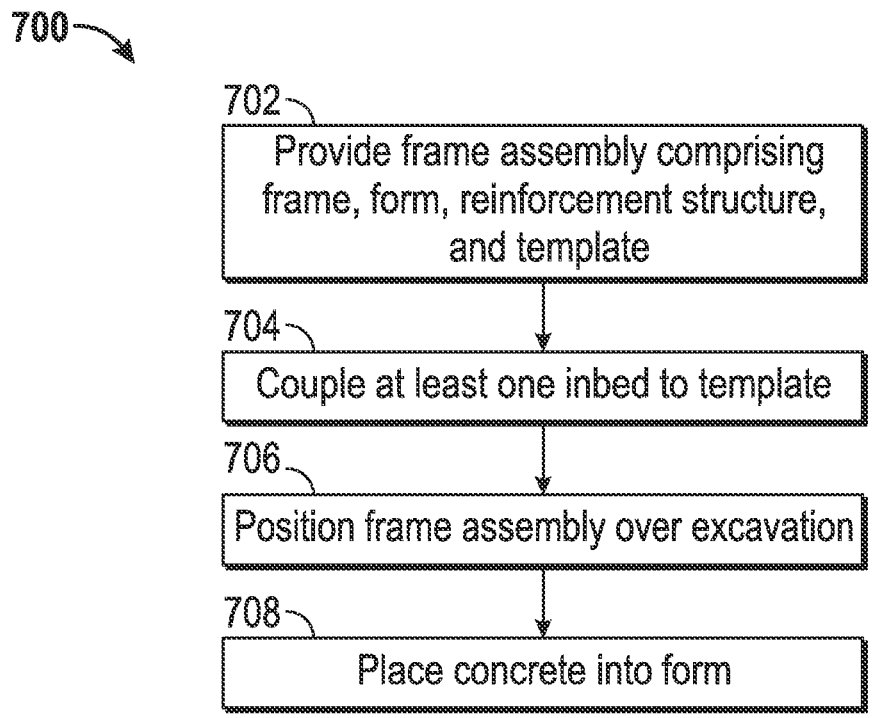
FIG. 15 is a process diagram illustrating a method for forming concrete footings in accordance with an embodiment.

FIG. 15 is a process diagram illustrating a process 700 for forming concrete footings in accordance with an embodiment. At block 702, the process 700 includes providing a frame assembly comprising a frame, a form, and a template, for example as described above in connection with FIG. 1-6C. The frame assembly can also include a concrete reinforcement structure, such as a mat and cage assembly, part or all of which can be disposed within the frame. At block 704, the process includes coupling at least one inbed to the template. At block 704, any number of inbeds can be coupled to the template, in any suitable pattern for the particular application, and in any suitable fashion. For example, in some embodiments, two anchor bolt inbeds can be coupled to each of two templates, in a generally rectangular pattern, by inserting each inbed through a hole in the template and removably securing the inbed to the template using a nut. At block 706, the process includes positioning the frame assembly (possibly including the reinforcement structure, if present) over an excavation, for example as described above in connection with FIGS. 8A and 8B. Positioning the frame assembly over an excavation can include suspending the form, and concrete reinforcing structure into an excavation. At block 708, the process includes placing concrete into the form. Placing concrete into the form can include pouring concrete through one or more openings in the frame assembly such that the concrete enters the form. Concrete can be placed until it reached a desired position with respect to the form, at which point the top of the concrete is also at a desired elevation for the construction site. Optionally, this process can also include releasing the inbeds from the template, separating the form from the hardened concrete, and removing the form and template from the excavation.

Figure 16:
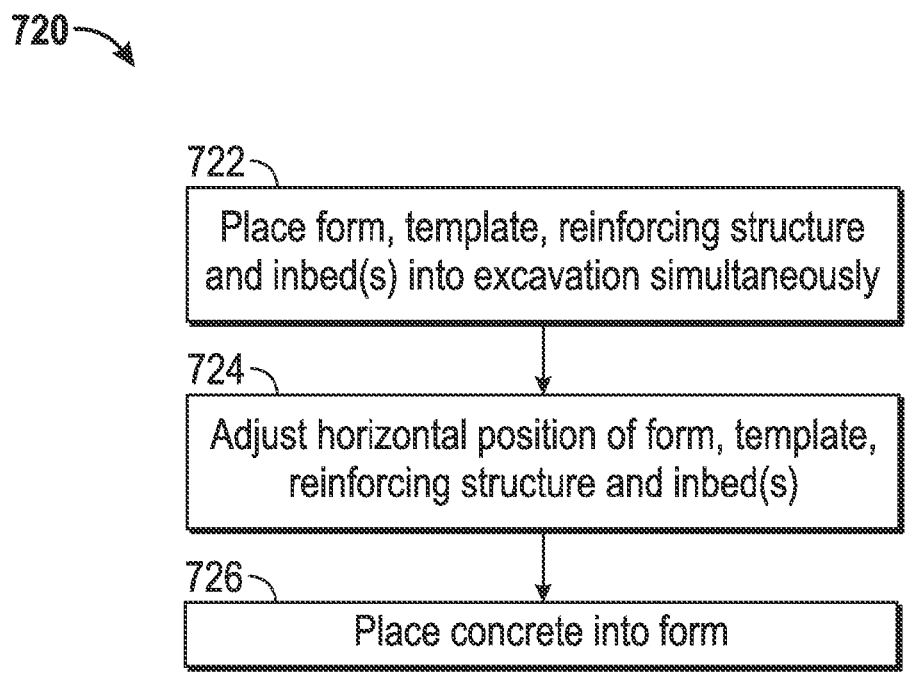
FIG. 16 is a process diagram illustrating a method for forming concrete footings in accordance with another embodiment.

FIG. 16 is a process diagram illustrating another process 720 for forming concrete footings in accordance with another embodiment. At block 722, the process 720 includes placing a form, a template, a concrete reinforcing structure, and one or more inbeds, for example as described above in connection with FIGS. 1-6C, into an excavation simultaneously. These components can be placed in the excavation simultaneously because the positions of these components can be fixed with respect to one another, at least during this step. Placing these components into an excavation can include suspending the form and/or the concrete reinforcing structure from a frame or other supporting structure. In some embodiments, placing these components into an excavation simultaneously can result in the form being positioned vertically at the desired elevation for the particular construction site. At block 724, the process 720 includes adjusting the horizontal position of the form, the template, the reinforcing structure, and the inbed(s). The horizontal positions of these components can be adjusted simultaneously, as the positions of these components can be fixed with respect to one another, at least during this step. At block 708, the process includes placing concrete into the form. Placing concrete into the form can include pouring concrete through one or more openings in the frame assembly such that the concrete enters the form. Concrete can be placed until it reached a desired position with respect to the form, at which point the top of the concrete is also at a desired elevation for the construction site. Optionally, this process can also include releasing the inbeds from the template, separating the form from the hardened concrete, and removing the form and template from the excavation.

These and other embodiments can be used to advantage in a wide variety of construction applications, including, for example, wind farm installations, solar technology installations, stadium bleachers, and light pole bases.

Although the foregoing has been described in detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention. Moreover, not all of the features, aspects and advantages described herein above are necessarily required to practice the present invention.

What is claimed is:

1. An assembly for use in forming a concrete spread footing in an excavation, the assembly comprising:
   a frame configured to extend over the excavation from a first side of the excavation to an opposing second side of the excavation;
   a form coupled to the frame, the form configured to define at least part of the shape of the concrete spread footing;
   a reinforcement structure configured to reinforce the concrete spread footing, at least part of the reinforcement structure being disposed within the form; and
   a template defining an inbed pattern over the form;
   wherein the frame is configured to support the form and the reinforcement structure in suspension over the excavation;
   wherein the frame is configured to be placed on in-ground supports disposed on first and second sides of the excavation and thereby set to grade; and
   wherein the frame comprises at least one attachment member configured to couple to the frame and the form, the at least one attachment member being disposed vertically below the template and spaced apart vertically from the template by a sufficient distance to allow workers' hands to access the space vertically between the at least one attachment member and the template.

2. The assembly of claim 1, further comprising at least one inbed, the at least one inbed being releasably coupled to the template.

3. The assembly of claim 1, wherein the frame includes at least one opening through which concrete can be placed into the form, at least when the form is suspended from the frame.

4. The assembly of claim 1, wherein the reinforcement structure is releasably coupled to the frame.

5. The assembly of claim 1, wherein the assembly is configured to allow separation and removal of the form and the frame from the concrete spread footing without requiring separation of the form from the frame.

6. The assembly of claim 1, wherein the template is removably coupled to the frame.

7. The assembly of claim 1, further comprising first and second in-ground supports configured to support the frame over the first and second sides, respectively, of the excavation.

8. An assembly for use in forming a concrete spread footing in an excavation, the assembly comprising:
- a frame configured to extend over the excavation from a first side of the excavation to an opposing second side of the excavation;
- a form coupled to the frame, the form configured to define at least part of the shape of the concrete spread footing;
- a reinforcement structure configured to reinforce the concrete spread footing, at least part of the reinforcement structure being disposed within the form, the reinforcement structure being releasably coupled to the frame; and
- a template defining an inbed pattern over the form;
- wherein the frame is configured to be placed on in-ground supports disposed on first and second sides of the excavation and thereby set to grade;
- wherein the frame is configured to support the form and the reinforcement structure suspended from the frame; and
- wherein the frame comprises at least one attachment member configured to couple to the frame and the form, the at least one attachment member being disposed vertically below the template and spaced apart vertically from the template by a sufficient distance to allow workers' hands to access the space vertically between the at least one attachment member and the template.

9. The assembly of claim 8, wherein the reinforcement structure is releasably coupled to the frame.

10. The assembly of claim 1, wherein the concrete spread footing comprises a pier.

11. The assembly of claim 10, wherein the form is configured to define the shape of the pier.

12. The assembly of claim 8, wherein the concrete spread footing comprises a pier.

13. The assembly of claim 12, wherein the form is configured to define the shape of the pier.

14. The assembly of claim 8, wherein the template is removably coupled to the frame.

15. An assembly for use in forming a concrete spread footing in an excavation, the assembly comprising:
- a frame configured to extend over the excavation from a first side of the excavation to an opposing second side of the excavation;
- a form coupled to the frame, the form configured to define at least part of the shape of the concrete spread footing;
- a reinforcement structure configured to reinforce the concrete spread footing, at least part of the reinforcement structure being disposed within the form; and
- a template defining an inbed pattern over the form;
- wherein the frame has a length in a first dimension which is longer than a length of the reinforcement structure in the first dimension, and
- wherein the frame is configured to be placed on in-ground supports disposed on first and second sides of the excavation and thereby set to grade;
- wherein the frame is configured to support the form and the reinforcement structure suspended from the frame; and
- wherein the frame comprises at least one attachment member configured to couple to the frame and the form, the at least one attachment member being disposed vertically below the template and spaced apart vertically from the template by a sufficient distance to allow workers' hands to access the space vertically between the at least one attachment member and the template.

16. The assembly of claim 15, wherein the assembly is configured to allow separation and removal of the form and the frame from the concrete spread footing without requiring separation of the form from the frame.

17. The assembly of claim 15, wherein the concrete spread footing comprises a pier.

18. The assembly of claim 17, wherein the form is configured to define the shape of the pier.

19. The assembly of claim 15, wherein the template is removably coupled to the frame.

\* \* \* \* \*